(12) United States Patent
Lee et al.

(10) Patent No.: US 8,427,421 B2
(45) Date of Patent: Apr. 23, 2013

(54) OPTION MENU FOR USE WITH A COMPUTER MANAGEMENT SYSTEM

(75) Inventors: Alex Lee, Taipei Hsien (TW); Yee Liaw, Warren, NJ (US); Alan Hsu, Taipei Hsien (TW)

(73) Assignee: Raritan Americas, Inc., Somerset, NJ (US)

( * ) Notice: Subject to any disclaimer, the term of this patent is extended or adjusted under 35 U.S.C. 154(b) by 1263 days.

(21) Appl. No.: 10/734,602

(22) Filed: Dec. 12, 2003

(65) Prior Publication Data

US 2005/0132403 A1 Jun. 16, 2005

(51) Int. Cl.
G09G 5/00 (2006.01)

(52) U.S. Cl.
USPC ........... 345/156; 715/810; 715/856; 345/157; 345/1.1; 345/589; 725/37

(58) Field of Classification Search .................. 345/132, 345/154, 156, 157, 589, 1.1; 715/810, 856; 312/126–130, 294, 281; 725/37–38
See application file for complete search history.

(56) References Cited

U.S. PATENT DOCUMENTS

| | | | |
|---|---|---|---|
| 5,257,390 A | 10/1993 | Asprey | |
| 5,268,676 A | 12/1993 | Asprey et al. | |
| 5,353,409 A | 10/1994 | Asprey et al. | |
| 5,526,024 A | 6/1996 | Gaglianello | |
| 5,648,795 A * | 7/1997 | Vouri et al. | 345/698 |
| 5,721,842 A * | 2/1998 | Beasley et al. | 709/204 |
| 5,732,212 A | 3/1998 | Perholtz | |
| 5,821,918 A * | 10/1998 | Reinert et al. | 345/643 |
| 5,884,096 A | 3/1999 | Beasley | |
| 5,913,034 A * | 6/1999 | Malcolm | 709/223 |
| 5,937,176 A | 8/1999 | Beasley | |
| 5,978,389 A | 11/1999 | Chen | |
| 6,112,264 A | 8/2000 | Beasley | |
| 6,119,148 A | 9/2000 | Chen | |
| 6,138,191 A | 10/2000 | Fujii et al. | |
| 6,345,323 B1 | 2/2002 | Beasley | |
| 6,388,658 B1 | 5/2002 | Ahern et al. | |
| 6,505,245 B1 * | 1/2003 | North et al. | 709/223 |
| 6,554,709 B1 | 4/2003 | Brenner | |
| 6,557,170 B1 | 4/2003 | Wilder et al. | |
| 6,671,756 B1 | 12/2003 | Thomas | |
| 6,768,501 B2 * | 7/2004 | Kitagawa et al. | 715/808 |
| 6,771,213 B2 | 8/2004 | Durst | |
| 7,310,775 B2 | 12/2007 | Cooper | |

(Continued)

OTHER PUBLICATIONS

Trial Transcript, *Apex v. Raritan*, Southern District of New York, Case No. 01-CV-4435, vol. 7, Jan. 2002.

(Continued)

*Primary Examiner* — Lun-Yi Lao
*Assistant Examiner* — Shaheda Abdin

(57) ABSTRACT

The present invention discloses an option menu for use with a computer management system. In operation, the option menu circuit combines or organizes a plurality of video signals generated by various OSD ICs to provide an option menu that is capable of various modes of operation. The option menu circuit is capable of displaying the option menu alone or in place of a portion of the video received from the selected connected computer. The option menu produced by the option menu circuit provides, inter alia, a list of computers that may be accessed by the computer management system. By utilizing a keyboard and/or cursor control device, a user may select the desired computer from the option menu.

21 Claims, 11 Drawing Sheets

U.S. PATENT DOCUMENTS

| | | | |
|---|---|---|---|
| 7,512,906 | B1 | 3/2009 | Baier |
| 2003/0035006 | A1 | 2/2003 | Kodosky |
| 2004/0131340 | A1* | 7/2004 | Antoun et al. ............... 386/125 |

OTHER PUBLICATIONS

Tron International, Inc., KVM Products Catalogs, 1997.
Tron International, Inc., Products Catalogs, 1996.
Tron International, Inc., Product Brochure, 1997, 4 pages.
Unisys, PW2 Advantage Series Rackmount Server, 1995.
Yee Liaw Deposition Transcript, Case No. 01-CV-4435, Mar. 3, 2005.
Yee-Shung Liaw Deposition Transcript, Case No. 01-CV-4435, Dec. 6, 2001.
The list of docket reports in the litigation: *Avocent Redmond Corp. v. Raritan Computer, Inc.*, Civil Action No. 1:01-CV-04435(PKC), United States District Court for the Southern District of New York.
File History of Reissue U.S. Patent No. 5,732,212, Apr. 11, 2002. Part 1.
File History of Reissue U.S. Patent No. 5,732,212, Apr. 11, 2002. Part 2.
File History of U.S. Appl. No. 10/032,325, Jun. 14, 2004.
Findings and Conclusions, *Apex v. Raritan*, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No. 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
*Marksman Transcript, Avocent v. Raritan*, Civil Action No. 4435, Feb. 3, 2005.
*Marksman Transcript, Avocent v. Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6, 1992.
Ocean Isle, Reachout Product Brochure, RCI 172996-173006, Jun. 1994.
PC World, New Products, May 1995, 2 pages.
PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView SE 4-Port KVM Switch, Nov. 8, 2000.
Tony Dekerf and Gary D. Davis, "A Close Look At Modern Keyboard, Video & Mouse Switches," 1995.
Trial Transcript, *Apex v. Raritan*, Southern District of New York, Case No. 01-CV-4435, vol. 1, Jan. 2002.
Trial Transcript, *Apex v. Raritan*, Southern District of New York, Case No. 01-CV-4435, vol. 2, Jan. 2002.
Trial Transcript, *Apex v. Raritan*, Southern District of New York, Case No. 01-CV-4435, vol. 3, Jan. 2002.
Trial Transcript, *Apex v. Raritan*, Southern District of New York, Case No. 01-CV-4435, vol. 4, Jan. 2002.
Trial Transcript, *Apex v. Raritan*, Southern District of New York, Case No. 01-CV-4435, vol. 5, Jan. 2002.
Trial Transcript, *Apex v. Raritan*, Southern District of New York, Case No. 01-CV-4435, vol. 6, Jan. 2002.
Adder, Products Brochure, APX 304572-304579, Apr. 1, 1998, 8 pages.
AdderViewOSD, Products Brochure, RCI 173246-173279, Aug. 1, 2002.
Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Avocent Redmond's Supplemental Responses to Raritan's Second Set of Post-Remand Interrogatories (Nos. 15R-17R), Mar. 14, 2005.
Apex, OutLook User Guide, 1997.
Apex et al., Products Brochure, APX 082949-082971, 1996.
Apex PC Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex et al, Products Brochure, APX 316564-316621.
Apex et al, Products Brochure, APX 316848-316909.
Apex et al, Products Brochure, APX 316910-316969.
Apex's Sales Brochure, Sep. 1, 1998, 1 page.
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix1 to Apex's Proposed Markman Findings, Jan. 25, 2002.
Badman, Switching into High Gear, Network Computing, Apr. 30, 2001.
Belkin, The OmniView PRO User Manual, Jul. 16, 2001.
Bruce McNair Deposition Transcript, Case No. 01-CV-4435, May 5, 2005.
Compaq, White papers, 1996, APX 083313-APX 083326, APX 083335-APX 083389.
Ching-I Hsu Deposition Transcript, Case No. 01-CV-4435, Mar. 11, 2005.
Cybex, Director Installer/User Guide, Nov. 1996.
Cybex, 4 x P & 1 x P KVM Switches Guide to Applications, 1996.
Datavision, Product Brochure, 1992, 3 pages.
Declaration of Joseph C. McAlexander in Support of Apex's Motion for a Preliminary Injunction, Sep. 17, 2001.
Declaration of Joseph C. McAlexander, III in the Civil Action No. 01-CV-4435, Dec. 15, 2004.
Declaration of Sharad Malik, Ph. D. Jan. 8, 2002.
Declaration of Sharad Malik, Ph.D. (Jan. 18, 2005).
Defendant Raritan Computer Inc.'s Claim Construction Statement (Dec. 15, 2004).
Defendant Raritan Computer Inc.'s Motion for Partial Summary Judgment (Jan. 8, 2002).

Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).
Defendant Raritan Computer, Inc.'s Response to Plaintiffs Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiff's First Set of Interrogatories (Nos. 9-12), Aug. 31, 2001.
Defendant Raritan Computer, Inc.'s Supplemental Response to Plaintiffs Second Set of Interrogatories (Nos. 9-12), Dec. 12, 2001.
DEI, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
Office Actions mailed on Sep. 9, 2011 and Jul. 11, 2012 in related U.S. Appl. No. 12/110,763.
Office Actions mailed on Jul. 13, 2011 and May 1, 2012 in related U.S. Appl. No. 12/110,797.
Defendant Raritan Computer Inc.'s Response to Plaintiff's First Set of Post Remand Interrogatory Requirements to Raritan (No. 1R-16R). (Dec. 16, 2004).

* cited by examiner

OPTION MENU FOR USE WITH A COMPUTER MANAGEMENT SYSTEM

FIELD OF THE INVENTION

The present invention relates generally to an option menu for use with a computer management system. Specifically, the enhanced video display of the present invention combines or organizes multiple video signals to provide a single option menu video display having more colors, more characters, and/or a larger size than traditional option menus. Although the present invention may be utilized in many applications, it is described herein to create an option menu that is incorporated within a computer/server management system. That is, the enhanced video display provides a menu of options (e.g., computers connected to the management system, video display adjustment settings, diagnostics, etc.) that is displayed on a system user's monitor. The system user then responds to the option menu (i.e., makes a selection) via the user's keyboard and/or cursor control device.

BACKGROUND OF THE INVENTION

In a typical computer environment, a Local Area Network (LAN) allows for one or more computer servers to be connected to several computers such that the resources of each server are available to each of the connected computers. In this system, a dedicated keyboard, video monitor, and cursor control device may be employed for each computer and computer server.

To maintain proper operation of the LAN, the system administrator must maintain and monitor the individual servers and computers. This maintenance frequently requires the system administrator to perform numerous tasks from the user console located at each server or computer. For example, to reboot a computer or to add or delete files, the system administrator is often required to operate the server or computer from its local user console, which may be located at a substantial distance from the system administrator's computer. Therefore, to accomplish the task of system administration, the system administrator must often travel far distances to access the local user consoles of remotely located servers and computers.

As an alternative, dedicated cables may be installed from each remotely located server and computer to the system administrator's user console to allow the system administrator to fully access and operate the remote computer equipment. However, such an alternative requires substantial wiring and wire harnessing, both of which may require tremendous cost. Additionally, as the distance between the system administrator's user console and the remote computer equipment increases, a decrease in the quality of the transmitted signal often results. Thus, utilizing dedicated cables between the system administrator's user console and remote computer equipment is often not a feasible alternative.

Space is also an important concern for many networked computer environments, especially large-scale operations such as data-centers, server-farms, web-hosting facilities, and call-centers. These environments typically require space to house a keyboard, video monitor, and cursor control device for each piece of computer equipment and for all of the wiring required to connect and power these components. As more equipment is added to a computer network, it becomes more probable that the space required for the equipment and associated cabling will exceed the space allotted for the network. Therefore, network architecture, equipment size, and available space are important issues when designing an effective computer network environment.

One method of reducing the amount of space required to house a computer network is to eliminate any equipment (i.e., keyboard, video monitor, cursor control device, etc.) that is not essential for proper operation of the computer network. Elimination of this equipment also eliminates the wiring associated with such equipment. This equipment and its associated wiring may be eliminated if a system administrator is able to access the remote computers from one user console, thereby eliminating the dedicated equipment and its associated wiring. Elimination of this unnecessary equipment decreases the amount of space required for computer network environments.

A keyboard, video monitor, and mouse ("KVM") switching system may be utilized to allow one or more user workstations to select and control any one of a plurality of remote computers via a central switching unit. Such systems are well known in the art and have been used by system administrators for at least 10 years. Specifically, a KVM switching system allows a system user to control a remote computer using a local user workstation's keyboard, video monitor, and cursor control device as if these local devices were directly connected to the remote computer. In this manner, a system user may access and control a plurality of remote computers, such as servers, from a single location (i.e., the location of the user workstation). The system user may select a specific remote computer to access or control using any one of a variety of methods known in the art. For example, the computer management system component can include an array of buttons where each button corresponds with the desired remote computer. Alternatively, a user can select the computer from a list displayed on a computer management system component's LCD or LED display, press one or more hot keys on the local user workstation's keyboard (e.g., F1, ALT-F1, F2, etc.), select the remote computer from a list displayed on the user workstation's monitor by pointing to it or scrolling to it using the user workstation's keyboard and/or cursor control device, etc.

The following references, which are discussed below, were found to relate to the field of computer management systems: Asprey U.S. Pat. No. 5,257,390 ("Asprey '390 patent"), Asprey U.S. Pat. No. 5,268,676 ("Asprey '676 patent"), Asprey U.S. Pat. No. 5,353,409 ("Asprey '409 patent"), Perholtz et al. U.S. Pat. No. 5,732,212 ("Perholtz"), Chen U.S. Pat. No. 5,978,389 ("Chen '389 patent"), Chen U.S. Pat. No. 6,119,148 ("Chen '148 patent"), Fujii et al. U.S. Pat. No. 6,138,191 ("Fujii"), Beasley U.S. Pat. No. 6,345,323 ("Beasley"), and Wilder et al. U.S. Pat. No. 6,557,170 ("Wilder").

The Asprey '390 patent, filed on Jul. 26, 1991 and issued on Oct. 26, 1993, discloses an extended range communications link for coupling a computer to a mouse, keyboard, and/or video monitor located remotely from the computer. The end of the link that is coupled to the computer has a first signal conditioning network (i.e., a network of circuitry that dampens the ringing and reflections of the video signals and biases them to a predetermined voltage level) that conditions the keyboard, video monitor and mouse signals. Conditioning the video monitor signals includes reducing their amplitude in order to minimize the "crosstalk" induced on the conductors adjacent to the video signal conductors during transmission of the video signals. This first signal conditioning network is coupled to an extended range cable having a plurality of conductors that transmits the conditioned signals, power, and logic ground potentials to a second signal conditioning network (i.e., a network of circuitry that terminates the video signals using a voltage divider and amplifies them), which restores the video signals to their original amplitude and outputs them to a video monitor.

The Asprey '676 patent, filed on Mar. 5, 1990 and issued on Dec. 7, 1993, discloses a communications link for use between a computer and a display unit, such as a video monitor, that allows these two components to be located up to three hundred (300) feet apart. An encoder located at the computer end of the communications link receives analog red, green, and blue signals from the computer and inputs each signal to a discrete current amplifier that modulates the signal current. Impedance matching networks then match the impedance of the red, green and blue signals to the impedance of the cable and transmit the signals to discrete emitter-follower transistors located at the video monitor end of the cable. Thereafter, these signals are amplified prior to inputting them to the video monitor. Concurrently, the horizontal synchronization signal is inputted to a cable conductor and its impedance is not matched to the impedance of the cable, thereby allowing the conductor to attenuate the horizontal synchronization signal and reduce noise radiation.

The Asprey '409 patent, filed on Jul. 19, 1990 and issued on Oct. 4, 1994, discloses an extended range communications link for transmitting transistor-transistor logic video signals from a local computer to a video monitor located up to a thousand feet (1,000) from the computer. The link includes a first signal conditioning circuit (i.e., a circuit that reduces the amplitude of the video signals, biases them to a selected potential, and applies them to discrete conductors of an extended cable) located at the computer end of the link for conditioning the received signals and transmitting them via the extended cable to a second signal conditioning circuit. The second signal conditioning circuit (i.e., a circuit that utilizes a threshold or pair of thresholds to effect reconstruction of the video signals prior to applying the signals to a video monitor) receives the transmitted video signals prior to inputting them to the video monitor. According to the Asprey '409 patent, performance of this process reduces the appearance of high frequency video noise on the keyboard clock conductor of the transmission cable, thereby preventing keyboard errors.

Perholtz, filed on Jan. 13, 1994 and issued on Mar. 24, 1998, discloses a method and apparatus for coupling a local user workstation, including a keyboard, mouse, and/or video monitor, to a remote computer. Perholtz discloses a system wherein the remote computer is selected from a menu displayed on a standard size personal computer video monitor. Upon selection of a remote computer by the system user, the remote computer's video signals are transmitted to the local user workstation's video monitor. The system user may also control the remote computer utilizing the local user workstation's keyboard and monitor. The Perholtz system is also capable of bi-directionally transmitting mouse and keyboard signals between the local user workstation and the remote computer. The remote computer and the local user workstation may be connected either via the Public Switched Telephone System ("PSTN") and modems or via direct cabling.

The Chen '389 patent, filed on Mar. 12, 1998 and issued on Nov. 2, 1999, discloses a device for multiplexing the video output of a plurality of computers to a single video monitor. The system includes three sets of switches for receiving the red, green, and blue components of the video signals from each computer. To select the video output of a specific computer for display on the video monitor, a user inputs two video selecting signals into a control signal generating circuit. Depending upon the inputted video selecting signals, the control signal generating circuit produces an output signal corresponding to the selected video output. Thereafter, a control signal is generated that indexes the three sets of switches to switch the video signals being output by the desired computer to the single video monitor. The three sets of switches transfer the incoming video signals to three sets of switch circuits and current amplifying circuits that provide input and output impedance matching, respectively. The tuned video signals are then displayed on the single video monitor.

The Chen '148 patent, filed on Jul. 29, 1998 and issued on Sep. 12, 2000, discloses a video signal distributor that receives, processes, and distributes video signals received from one or more computers to a plurality of video monitors. The video signal distributor includes three transistor-based, voltage-amplifying circuits to individually amplify the red, green and blue video signals received from each computer prior to transmitting these signals to a video monitor. The video signal distributor also includes a synchronization signal buffering device that receives horizontal and vertical synchronization signals from each computer and generates new synchronization signals based upon the quantity of video signals that are output to the video monitors.

Fujii, filed on Feb. 10, 1998 and issued on Oct. 24, 2000, discloses a system for selectively operating a plurality of computers that are connected to one common video monitor. The Fujii system includes a data input device for entering data in any one of the plurality of connected computers. The system also includes a main control circuit, which is connected to the data input device, and a selection circuit for providing the entered data and receiving the video signals from the selected computer. A user selects a remote computer by supplying the command code associated with the desired remote computer utilizing the keyboard and/or mouse. A selection circuit receives the inputted commands and identifies the selected computer. The selection circuit then sends a signal indicative of the selected remote computer to a main control circuit, which provides communication between the keyboard, video monitor, and mouse and the selected remote computer.

Similar to Perholtz, Beasley, filed on Jun. 9, 2000 and issued on Feb. 5, 2002, discloses a specific implementation of a computerized switching system for coupling a local keyboard, mouse and/or video monitor to one of a plurality of remote computers. In particular, a first signal conditioning unit includes an on-screen programming circuit that displays a list of connected remote computers on the local video monitor. To activate the menu, a user depresses, for example, the "print screen" key on the local keyboard. The user selects the desired computer from the list using the local keyboard and/or mouse.

According to Beasley, the on-screen programming circuit requires at least two sets of tri-state buffers, a single on-screen processor, an internal synchronization generator, a synchronization switch, a synchronization polarizer, and overlay control logic. The first set of tri-state buffers couples the red, green, and blue components of the video signals received from the remote computer to the video monitor. That is, when the first set of tri-state buffers are energized, the red, green, and blue video signals are passed from the remote computer to the local video monitor through the tri-state buffers. When the first set of tri-state buffers are not active, the video signals from the remote computer are blocked. Similarly, the second set of tri-state buffers couples the outputs of the single on-screen processor to the video monitor. When the second set of tri-state buffers is energized, the video output of the on-screen programming circuit is displayed on the local video monitor. When the second set of tri-state buffers is not active, the video output from the on-screen programming circuit is blocked. Alternatively, if both sets of tri-state buffers are energized, the remote computer video signals are combined with the video signals generated by the on-screen processor prior to display on the local video monitor.

The on-screen programming circuit disclosed in Beasley also produces its own horizontal and vertical synchronization signals. To dictate which characters are displayed on the video monitor, the CPU sends instructional data to the on-screen processor. This causes the on-screen processor to retrieve characters from an internal video RAM for display on the local video monitor.

The overlaid video image produced by the on-screen processor, namely a Motorola MC141543 on-screen processor, is limited to the size and quantity of colors and characters that are available with the single on-screen processor. In other words, the Beasley system is designed to produce an overlaid video that is sized for a standard size computer monitor (i.e., not a wall-size or multiple monitor type video display) and is limited to the quantity of colors and characters provided by the single on-screen processor.

During operation of the Beasley system, a remote computer is chosen from the overlaid video display. Thereafter, the first signal conditioning unit receives keyboard and mouse signals from the local keyboard and mouse and generates a data packet for transmission to a central cross point switch. The cross point switch routes the data packet to the second signal conditioning unit, which is coupled to the selected remote computer. The second signal conditioning unit then routes the keyboard and mouse command signals to the keyboard and mouse connectors of the remote computer. Similarly, video signals produced by the remote computer are routed from the remote computer through the second signal conditioning unit, the cross point switch, and the first signal conditioning unit to the local video monitor. The horizontal and vertical synchronization video signals received from the remote computer are encoded on one of the red, green or blue video signals. This encoding reduces the quantity of cables required to transmit the video signals from the remote computer to the local video monitor.

Wilder, filed on May 5, 1998 and issued on Apr. 29, 2003, discloses a keyboard, video monitor, mouse, and power ("KVMP") switching system having an on screen display circuit that provides a visual means for accessing the KVMP switch. A first set of switching circuits coupled to a plurality of computers and the on screen display circuit allows a user to access and control any of the remote computers using a local keyboard, video monitor, and mouse. A second set of switching circuits coupled to the power supply of each remote computer and the on screen display circuit allows a user to control the electrical power to each remote computer. To select a remote computer using the Wilder system, a user activates the on-screen display by entering a "hot key" with either the keyboard and/or mouse. Initially, the on-screen display prompts the user to enter a username and password. After the user is verified, the user is provided a list of all attached remote computers. The user utilizes the local keyboard and mouse to select and control the power supply of the desired remote computer. Wilder incorporates a single on-screen processor for generation of the list of remote computers.

In view of the foregoing, a need clearly exists for a computer management system that is compatible with both standard size video monitors (e.g., monitors ranging from 13" to 21") and larger than standard size video monitors. In addition, a need clearly exists for a computer management system that provides an option menu that contains more characters and/or more colors than those available with a single on-screen processor. There is also a need for a computer management system having an option menu that provides greater flexibility and definition for identifying options and connected computers. Furthermore, there is a need for a computer management system that provides an option menu having a large quantity of available colors, which may be used to color code connected computers or options for purposes such as identifying the general location of each connected computer (e.g., connected computers having a blue description are located in Quadrant 1, connected computers having a green description are located in Quadrant 2, etc.). Furthermore, there exists a need for a computer management system that provides an option menu that allows the system user to choose the desired mode of operation (e.g., larger video display, more colors, more characters, etc.). Also, a need exists for a computer management system that provides an option menu that allows the system user to choose the size of the video monitor that is connected to the local user workstation.

SUMMARY OF THE INVENTION

It is often convenient to control one or more connected computers from one local set of peripheral devices (i.e., keyboard, video monitor, cursor control device, etc.). Since the majority of computers in use today incorporate or are designed to be compatible with commonly known and used computer technologies (e.g., IBM, Apple, Sun, etc.), many computers use identical or similar electrical connectors to connect peripheral devices. Also, a computer typically contains a dedicated electrical connector for each type of peripheral device to which the computer is connected. Generally, the cables that connect such peripheral devices to the respective electrical connector are approximately six (6) feet in length, thereby limiting the distance from the computer at which the peripheral devices may be located. Alternatively, the devices may communicate wirelessly, however, the wireless signal similarly degrades as distance between the computer and the devices increases.

In many circumstances, it is desirable to separate the peripheral devices from the computer due to space constraints. However, one skilled in the art may readily appreciate that separating a computer from its peripheral devices by substantial distances is likely to increase cabling costs. In addition, signals such as cursor control device, keyboard, video, or audio signals degrade when transmitted over distances greater than fifteen (15) feet resulting in decreased reliability of keyboard and cursor control device commands, and lower quality video and audio output. This degradation occurs for a few reasons including the induction of "noise", such as "crosstalk", between adjacent conductors and an increase in the impedance of the signal transmission.

In addition to extending the distance between a computer and its peripheral devices, it is also convenient to access and operate more than one computer from a single set of peripheral devices. Again, this feature is desirable when space is limited, or when a large number of computers need to be administered. The use of only one set of peripheral devices to control multiple computers eliminates the space required to house a dedicated set of peripheral devices for each computer to be accessed and controlled. Furthermore, an increase in maintenance efficiency is realized if a system administrator can maintain multiple computers from a single set of peripheral devices. For example, the system administrator no longer must travel to each computer that requires maintenance.

The present invention provides a computer management system having an option menu that facilitates accessing and controlling connected computers. This option menu allows, for example, a system administrator to select a connected computer, enter video signal tuning calibration information, gather network diagnostics, program computer management system components, etc. The option menu is activated by entering predetermined keyboard and/or cursor control device commands. Upon choosing the option of selecting a connected computer, a sub-menu of connected computers is displayed on the user workstation's monitor that includes all connected computers. The system administrator may then scroll the sub-menu or access a further sub-menu to select the desired connected computer.

The option menu of the computer management system of the present invention can have a larger overall size (i.e., it is visible on a larger screen) and/or contain more colors and more characters than the typical video display provided by a single on-screen display integrated circuit ("OSD IC"). The option menu of the present invention is compatible with both standard size video monitors (e.g., monitors ranging from 13" to 21" in size) and larger monitors. Monitor size is simply selected by the system user via the option menu. In addition, the larger quantity of available characters and/or colors provides greater flexibility and definition in identifying options and in identifying and selecting connected computers.

The option menu is generated by a plurality of OSD ICs. The video outputs of the OSD ICs can be combined or strategically organized to produce an option menu having a larger size, more colors, and/or a greater number of characters than is possible with a single OSD IC. In the preferred embodiment, a first set of OSD ICs is utilized to create the option menu, and a second set of OSD ICs is utilized to create a video image that represents the cursor. A software algorithm executed by a system level IC works in conjunction with minimal circuitry to combine and/or strategically organize the video outputs of the first and second sets of OSD ICs to provide the option menu and cursor video signals.

The computer management system of the present invention may be utilized to provide compatibility between various operating systems and/or communication protocols. The present invention allows the same set of local peripheral devices to access connected computers executing a variety of operating systems and protocols, including but not limited to, those manufactured by Microsoft Corporation ("Microsoft") (Windows), Apple Computer, Inc. ("Apple") (Macintosh), Sun Microsystems, Inc. ("Sun") (Unix), Digital Equipment Corporation ("DEC"), Compaq Computer Corporation ("Compaq") (Alpha), International Business Machines ("IBM") (RS/6000), Hewlett-Packard Company ("HP") (HP9000), and SGI (formerly "Silicon Graphics, Inc.") ("IRIX").

Additionally, local devices such as a keyboard and cursor control device may communicate with the local user workstation using a variety of protocols including, but not limited to Universal Serial Bus ("USB"), American Standard Code for Information Interchange ("ASCII"), and Recommend Standard-232 ("RS-232").

A variety of cabling mechanisms may be used to connect the local user workstations and the connected computers to the computer management system of the present invention. Preferably, the present invention incorporates a single Category 5 Universal Twisted Pair ("CAT 5") cable to connect each user terminal ("UST")(i.e., the computer management system component that connects the keyboard, video monitor, and cursor control device of the local user workstation to the computer management system of the present invention) and each computer interface module ("CIM")(i.e., the computer management system component that connects the connected computer to the computer management system of the present invention) to the matrix switching unit ("MSU") of the computer management system of the present invention. However, other cabling or wireless communications may be used without departing from the spirit of the present invention.

Therefore, it is an object of the present invention to provide an improved computer management system containing an option menu that may be larger and/or contain more colors and characters than is standardly available.

Further, it is an object of the present invention to provide an improved computer management system having an option menu that operates in any one of multiple modes, wherein the modes of operation allow a system user to select the size, quantity of characters, and quantity of colors for the option menu based upon the user's preferences and/or the size of the video monitor connected to the local user workstation.

Furthermore, it is an object of the present invention to facilitate identification of each computer connected to the computer management system by allowing information technology ("IT") personnel to designate lengthier names displayed in the option menu for each connected computer to more adequately describe each connected computer.

It is still a further object of the present invention to provide greater organizational flexibility by allowing IT personnel to color code computer names displayed in the option menu to facilitate grouping of computers connected to the computer management system.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
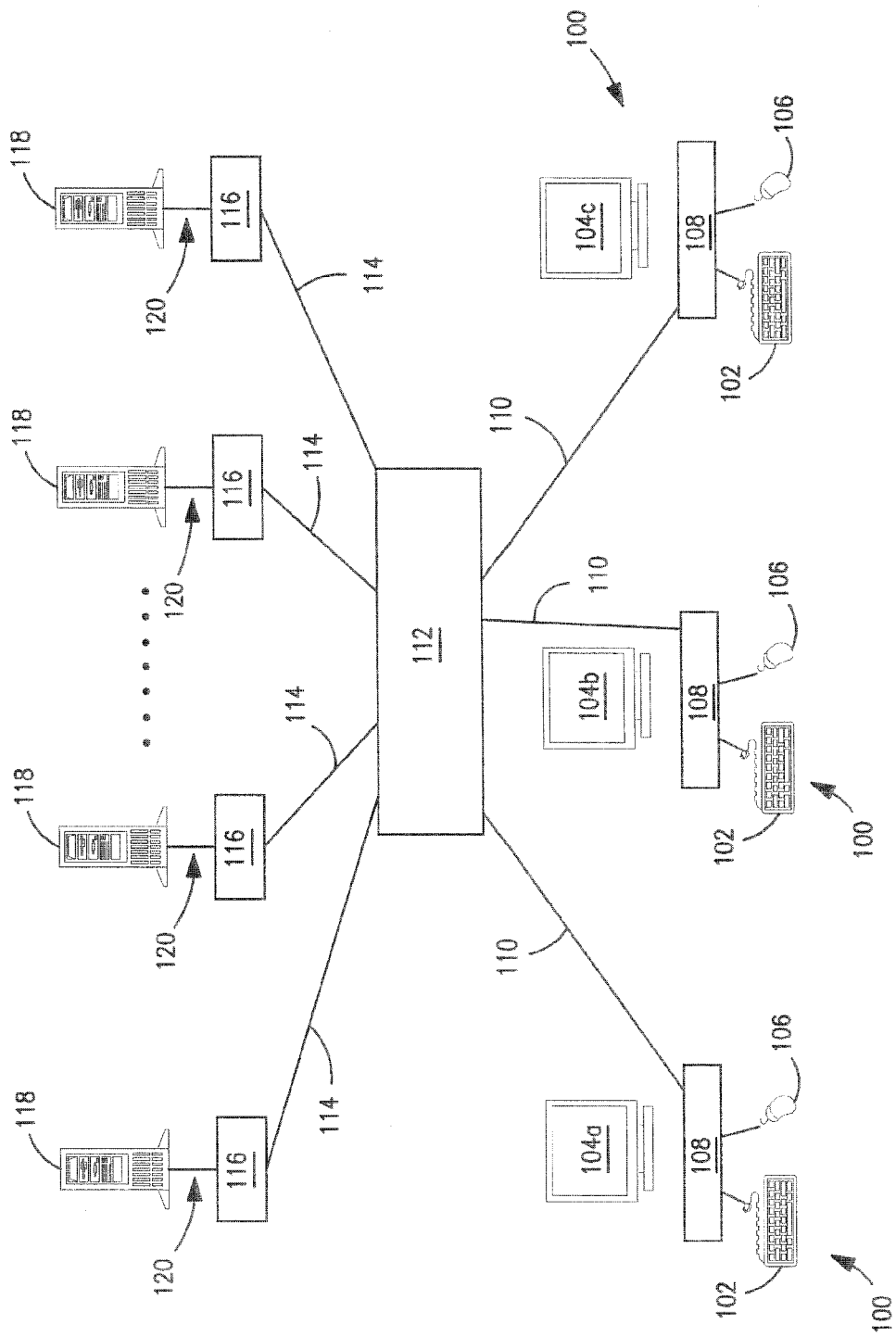
FIG. 1 is a schematic representation of a computer management system according to the preferred embodiment of the present invention illustrating the connection of a plurality of user workstations, which each include a keyboard, video monitor, and cursor control device, to multiple connected computers, wherein the system includes a plurality of USTs and CIMs interconnected by at least one MSU.

Referring first to FIG. 1, depicted is the architecture of the preferred computer management system in accordance with the present invention. Specifically, a modular, intelligent, computer management system is shown including a centrally located MSU 112, multiple USTs 108 connected to keyboards 102, video monitors 104, and cursor control devices 106, and multiple CIMs 116 connected to connected computers 118. Each UST 108 and CIM 116 is connected to MSU 112 via communication link 110 and communication link 114, respectively.

Although single CAT 5 cabling is the preferred cabling for use with the present invention, other cabling may be used, such as coaxial, fiber optic or multiple CAT 5 cables, depending on the specific needs of the system user. CAT 5 cabling is preferred because it reduces cabling cost while maintaining the strength of the signals that are transmitted over extended distances. Additionally, the use of single CAT 5 cabling minimizes the space required to house the computer system and its associated wiring.

Individual CAT 5 cables may be used for connection of each UST 108 and each CIM 116 to MSU 112. Conventional CAT 5 cables include four (4) twisted pair of wires. In the preferred embodiment of the present invention, three (3) of these twisted pair are utilized for the transmission of video signals. Each of the three (3) twisted pair transmits one of the three video color signals (i.e., red, green or blue). To allow all video signals to be transmitted via only three (3) twisted pair, the horizontal and vertical synchronization signals, which would otherwise each require their own twisted pair, are individually encoded on one of the red, green, or blue video signals. That is, each synchronization signal is encoded on its own, dedicated color signal. For example, the vertical synchronization signal may be encoded on the blue video signal while the horizontal synchronization signal may be encoded on the green video signal. All other non-video signals such as keyboard, cursor control device, and audio signals, are transmitted on the fourth twisted pair cable.

The single CAT 5 cables are connected to UST 108, MSU 112, and CIM 116 by plugging each end into a RJ-45 connector located on these respective components. Although RJ-45 connectors are preferred, other types of connectors may be used, including but not limited to RJ-11, RG-58, RG-59, British Naval Connector ("BNC"), and ST connectors.

As depicted in FIG. 1, the connected computer management system includes local user workstations 100, each preferably comprising dedicated peripheral devices such as keyboard 102, video monitor 104, and/or cursor control device 106. Other peripheral devices may also be located at workstation 100, such as printers, scanners, video camera biometric scanning devices, microphones, etc. Each peripheral device is directly or indirectly (i.e., through another component) connected to UST 108, which is attached to MSU 112 via communication link 110. Of course, wireless peripheral devices may also be used with this system. During operation, all electronic signals received at UST 108 from attached peripheral devices are transmitted to MSU 112 via communication link 110. Thereafter, the signals are transmitted to the desired CIM 116 via another communication link 114. CIM 116, which is coupled to a connected computer 118 via communication link 120, transmits the received signals to the respective ports of connected computer 118.

Each UST 108 incorporates the option menu circuit of the in accordance with the present invention that enables a user to access and control a connected computer via an option menu displayed on the local user workstation's video monitor. For example, if a user wishes to connect to a specific connected computer 118, the user may first enter a series of keyboard and/or cursor control device commands to cause UST 108 to produce the option menu on video monitor 104. This option menu, as discussed in detail below, lists all connected computers 118. By utilizing keyboard 102 and cursor control device 106, the user selects the desired connected computer 118 from the option menu. The user is then provided access to the selected connected computer 118. The option menu also facilitates system programming and provides information useful for system operation. Furthermore, multiple security features such as passwords, system user histories, etc. may be implemented and operated in conjunction with the option menu.

CIM 116 is compatible with all commonly used, present day computer operating systems and protocols, including, but not limited to, those manufactured by Microsoft (Windows), Apple (Macintosh), Sun (Unix), DEC, Compaq (Alpha), IBM (RS/6000), HP (HP9000) and SGI (IRIX). Additionally, local devices such as keyboard 102 and cursor control device 106 may communicate with connected computers via a variety of protocols including Universal Serial Bus ("USB"), American Standard Code for Information Interchange ("ASCII") and Recommend Standard-232 ("RS-232").

The computer management system of the present invention is scalable and may be configured to connect a large number of user workstations 100 with a large number of connected computers 118. Preferably, the system according to the present invention allows eight (8) USTs 108 and thirty-two (32) CIMs to be connected via one MSU 112 while still achieving optimal signal transmission. If additional USTs or CIMs must be added, alternate embodiments of the present invention allows multiple MSUs 112 to be utilized to connect as many as sixty-four (64) user workstations 100 and ten thousand (10,000) connected computers 118.

Figure 2A:
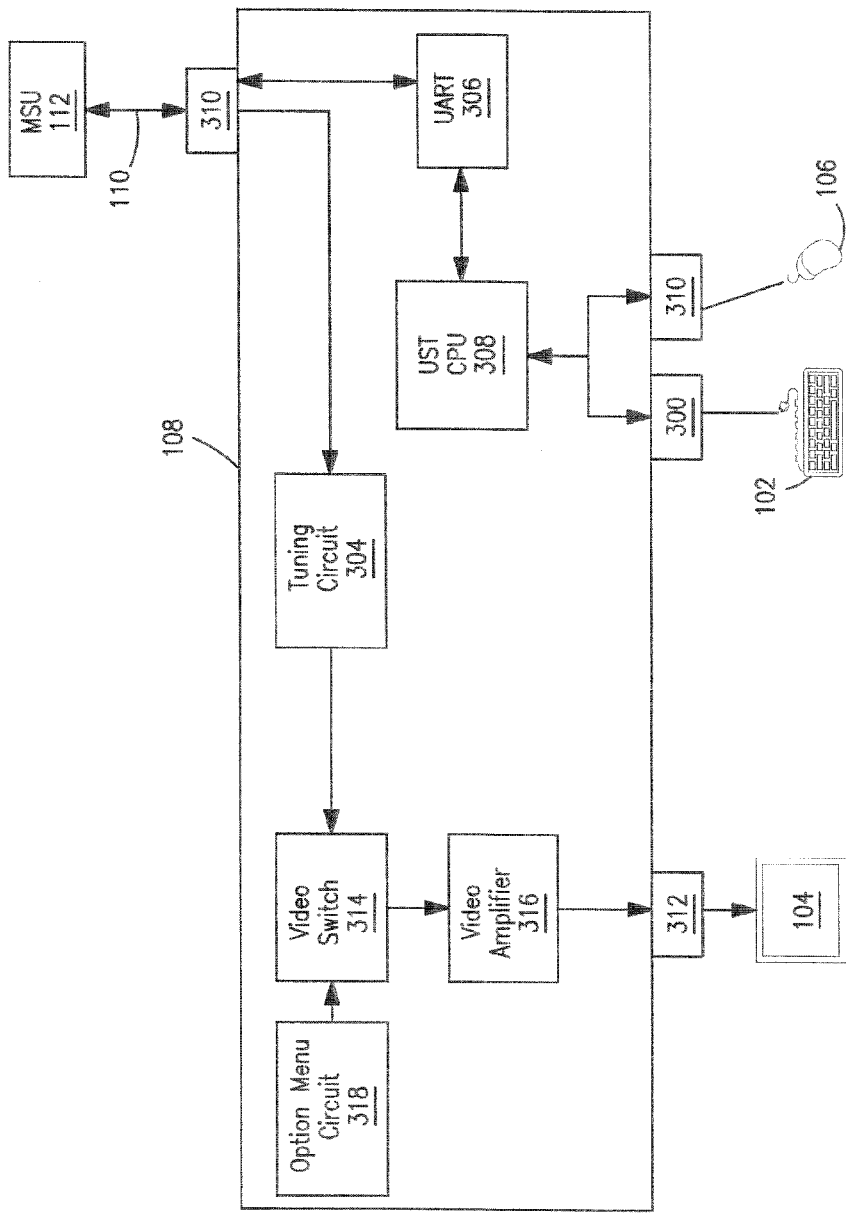
FIG. 2A is a schematic representation of the preferred embodiment of the internal structure of the UST shown in FIG. 1, specifically illustrating the circuitry that allows for the selection of connected computer video signals or option menu video signals for display on the video monitor.

Turning next to FIG. 2A, depicted is a schematic diagram of the preferred internal structure of UST 108 according to the present invention. As shown, UST 108 couples keyboard 102, video monitor 104, and cursor control device 106 with MSU 112. Signals generated by keyboard 102 and cursor control device 106 are received by UST CPU 308 via keyboard port 300 and cursor control device port 310, respectively, using industry standard connectors and cabling. Wireless keyboards and cursor control devices may also be used. UST CPU 308 then generates data packets that represent the keyboard and cursor control device information in the received signals (as discussed below with reference to FIG. 6). The newly generated data packets are transmitted to UART 306, whereupon the they are converted to a serial format and transmitted through port 302 to MSU 112 via independent communication link 110. It should be noted that the converted data packets may alternatively be transmitted via a wireless connection.

Conversely, keyboard and cursor control device signals received from connected computer 118 (FIG. 1) through MSU 112 and communication link 110 are received as serial data packets at port 302. Thereafter, UART 306 de-serializes the received serial data packets and transmits them to UST CPU 308. Of course, in the alternative, a non-UART device may be used to de-serialize the received serial data packets. UST CPU 308 then uses the information contained in the data packets to emulate keyboard and cursor control device signals to keyboard 102 and cursor control device 106 via keyboard port 300 and cursor control device port 310, respectively.

Unidirectional video signals generated at connected computer 118 (FIG. 1) are also received at port 302 from MSU 112 via communication link 110. However, these video signals are transmitted to tuning circuit 304, which tunes the video signals (discussed below with respect to FIG. 2C) to a desired amplitude and frequency characteristics (e.g., to correct for signal degradation). The tuned red, green, and blue components of the video signals are transmitted to video switch 314. Thereafter, video switch 314 determines whether to transmit the video signals received from tuning circuit 304 (i.e., the video signals received from one of the connected computers 118) or the video signals received from option menu circuit 318 to video amplifier 316. Finally, the amplified video signals are transmitted via video monitor port 312 for display on video monitor 104.

Figure 2B:
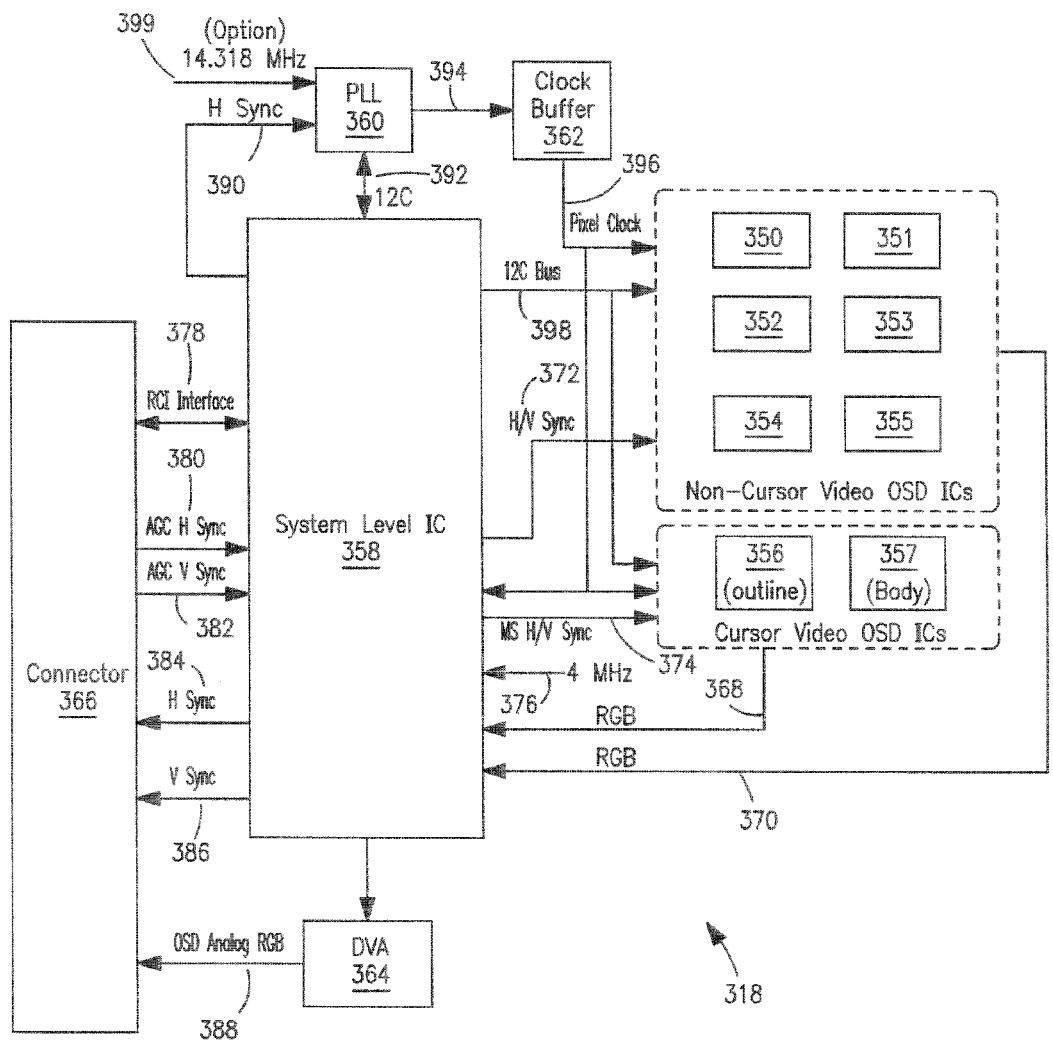
FIG. 2B is a schematic representation of the preferred embodiment of the option menu circuit shown in FIG. 2A, which generates the option menu and cursor video signals for display on the video monitor.

Option menu circuit 318 is shown in greater detail in FIG. 2B. Preferably, option menu circuit 318, and all of its components are implemented on a daughter board (i.e., a printed circuit board that plugs into another printed circuit board to augment its capabilities). As shown, option menu circuit 318 comprises OSD ICs 350-357, system level IC 358, PLL 360, clock buffer 362, digital to analog ("D/A") converter 364, and connector 366. According to the preferred embodiment of the present invention, the option menu and cursor video displays are generated by eight (8) Myson Technology MTV118 On-Screen Display for LCD Monitor ICs, depicted in FIG. 2B as OSD ICs 350-357. However, a different quantity and/or a different type of OSD IC may be substituted without departing from the spirit of the present invention. Alternatively, an option menu circuit comprising individual electronic components (e.g., logic gates, resistors, capacitors, etc.) or a combination of non-OSD ICs (e.g., a processor IC, a programmable logic controller IC, etc.) configured to produce the same output as OSD ICs 350-357 may be used to generate the option menu and cursor video displays.

Figure 3:
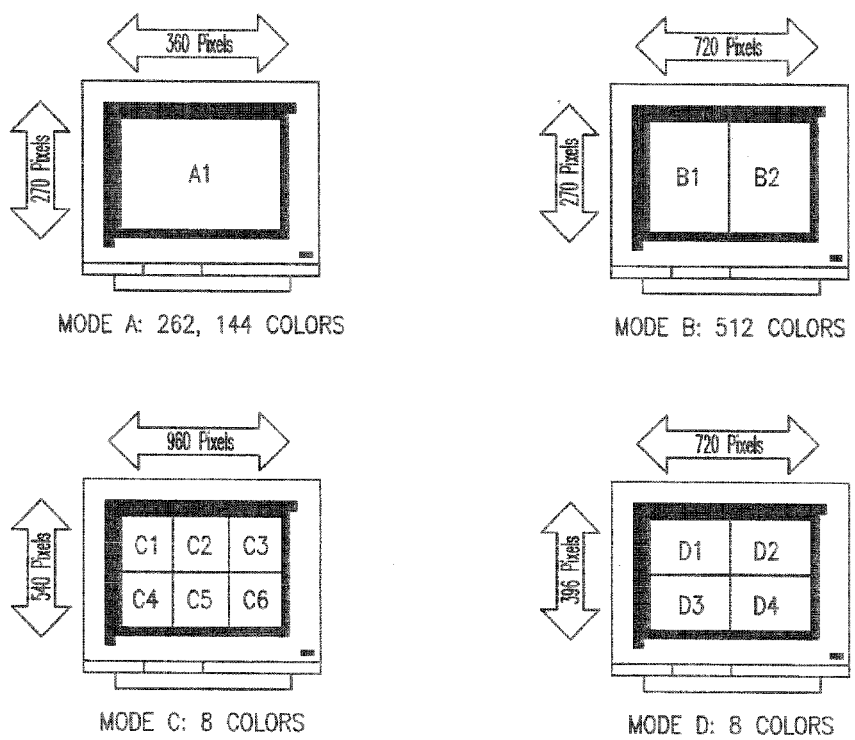
FIG. 3 is a schematic representation of the preferred embodiment of the four modes of operation of the option menu circuit shown in FIG. 2A and FIG. 2B.

In the preferred embodiment of the present invention, each individual OSD IC is capable of producing eight (8) background colors, eight (8) foreground colors, and a video display having a maximum of fifteen (15) rows by thirty (30) columns of characters, wherein each character comprises a 12 by 18 pixel matrix. However, the present invention combines the video signals generated by multiple OSD ICs to create a single option menu that is larger (i.e., contains more characters) and/or contains more colors than the display provided by an individual OSD IC. Preferably, OSD ICs 350-355 generate the non-cursor portion of the option menu in any one of four (4) modes A-D, which are illustrated in FIG. 3. The remaining two (2) OSD ICs 356-357 generate the cursor video display used in conjunction with the option menu.

As depicted in the upper left hand corner of FIG. 3, when the system of the present invention is indexed to Mode A, all six (6) OSD ICs 350-355 supply video to the same portion A1 of a fifteen (15) row by thirty (30) column video display. This configuration allows the eight colors of each OSD IC 350-355 to be combined to produce a maximum of two hundred sixty two thousand one hundred forty four (262,144) colors. Each OSD IC is capable of supplying two (2) different green signals, (2) different red signals, and (2) different blue signals, wherein the difference in the signals is a difference in the signal's color. Since the color of each pixel is the combination of the colors of the red, blue, and green signals that create the pixel, two (2) colors of red, green, and blue allow $2^3$, or eight (8), color combinations (i.e., pixel colors) to be created by an individual OSD IC. Similarly, when each of the red, green, and blue signals of six OSD ICs 350-355 are combined, $2^6$ (i.e., 64) colors of each of the red, green, and blue signals may be created. Since each pixel is a combination of any one of each of the sixty-four (64) red, green, and blue signals, the total number of resulting pixel colors is $64^3$ (i.e., 262,144). Thus, in Mode A, the system of the present invention uniquely combines the outputs of six standard OSD ICs into one on-screen display with the ability to represent a pixel in this display with any of 262,144 different color values.

If the system is indexed to Mode B (see upper right-hand corner of FIG. 3), the video output of three (3) OSD ICs 350, 352, and 354 are combined to supply video to the left half (i.e., section B1) of a fifteen (15) row by sixty (60) column video display. The video output of three (3) OSD ICs 351, 353, and 355 are combined to supply video to the right half of the screen (i.e., section B2). Combining three OSD ICs allows $2^3$, or eight (8), colors for each of the red, green, and blue signals, resulting in $8^3$, or five hundred twelve (512), total pixel colors. Thus, in Mode B, the system of the present invention again combines the outputs of six standard OSD ICs into one on-screen display with the ability to represent a pixel with any of 512 different color values. Further, in Mode B, the system of the present invention allows for a larger on-screen menu (15 row by 60 column display) than is possible with systems that only use one OSD IC or for a display with more characters than was previously possible.

Alternatively, if the system is indexed to Mode C (see lower left-hand corner of FIG. 3), each of the six (6) OSD ICs 350-355 supplies its own portion of a thirty (30) row by eighty (80) column video display. The video output of OSD IC 350 is displayed in section C1. Similarly, the video outputs of each one of OSD ICs 351-355 is displayed in one of the sections C2-C6. Importantly, this configuration of OSD ICs 350-355 is capable of producing a thirty (30) row by ninety (90) column video display, thus allowing for an on-screen display on monitors that are larger than standard size. Of course, the size of the video display in sections C3 and C6 can be cut or cropped in order to be compatible with various sized monitors.

If the system is indexed to the Mode D, as depicted in the lower right-hand portion of FIG. 3, only the four (4) OSD ICs 350-353 are required, and each of OSD ICs 350-353 supplies its own portion of a twenty-two (22) row by sixty (60) column video display. The video output of each one of OSD ICs 350-353 is displayed in one of each of the sections D1-D4. Similar to that described above for Mode C, the configuration of OSD ICs 350-353 in Mode D is capable of producing a thirty (30) row by sixty (60) column video display. Again, this size can be cropped to fit certain size monitors.

Mode D also represents an alternate embodiment of the present invention in which only four (4) total OSD ICs 350-353 are used to create the option menu (i.e., OSD ICs 354 and 355 are eliminated). While such an embodiment may be produced at a lower cost than the disclosed preferred embodiment, Modes A-C would not be available.

Preferably, OSD ICs 356 and 357 are used in each of Modes A-D to generate the cursor portion of the option menu video display. OSD IC 356 generates the video signals that represent the outline of the cursor, while OSD IC 357 generates the video signals that represent the body of the cursor. The present invention allows the cursor video image to be programmed as any one of eight (8) different fonts.

Referring back to FIG. 2B, preferably, each of OSD ICs 350-357 operate in conjunction with system level IC 358, PLL 360, clock buffer 362, and D/A converter 364. PLL 360 is a phase-locked loop ("PLL")(i.e., an electronic circuit that controls an oscillator) that drives clock buffer 362 via connection 394 based upon a system level IC 358-generated option menu horizontal synchronization signal input to PLL 360 via connection 390. Alternatively, PLL 360 may be supplied a 14.318 MHz crystal oscillator via connection 399 in lieu of the option menu's horizontal synchronization signal. Clock buffer 362 supplies a pixel clock signal to OSD ICs 350-357 and system level IC 358 via connection 396. In the preferred embodiment of the present invention, the clock buffer is implemented with an external PLL, specifically AMI Semiconductor's Programmable Line Lock Clock Generator FS6131, which is controlled by system level IC 358 via 12C bus 392. However, the clock buffer may be implemented in any one of the various methods known in the art. For example, one such method utilizes a clock buffer IC that includes an integrated PLL.

Furthermore, according to the preferred embodiment, system level IC 358 is an Atmel AT94K series system level IC that includes an 8-bit microcontroller (i.e., a single IC that contains a processor, RAM, ROM, clock, and input/output control unit), Field Programmable Gate Array ("FPGA") (i.e., a programmable logic controller having a high density of gates), Static RAM ("SRAM"), and a JTAG in-circuit emulator. This IC is preferably driven by a 4 MHz clock signal via connection 376, although clock signals having other frequencies may also be employed. Also, system level IC 358 may be implemented as a plurality of individual electronic components (e.g., logic gates, resistors, capacitors, etc.) or a combination of non-system level ICs (e.g., a processor IC, a programmable logic controller IC, an emulator IC, etc.) without departing from the spirit of the present invention.

To facilitate manufacturing of the computer management system, option menu circuit 318, and all of its components (e.g., OSD ICs 350-357, system level IC 358, PLL 360, clock buffer 362, and D/A converter 364) may be implemented on a daughter board (i.e., a printed circuit board that plugs into another printed circuit board to augment its capabilities). This daughter board then plugs into the main UST circuit board, a block diagram of which is illustrated in FIG. 2A, via connector 366. This feature allows the object of the present invention (i.e., an option menu that is larger, contains more colors, and/or more characters) to be easily implemented as an option to a standard computer management system.

UST CPU 308 controls system level IC 358 via remote control interface ("RCI") 378, which uses a 16-bit address, an 8-bit data access, and a busy module. That is, UST CPU 308 sends instructions to system level IC 358 via RCI 378. UST CPU 308 may command system level IC 358 to perform many actions via RCI 378 such as enabling/disabling the cursor, changing the cursor font, changing the cursor color, debugging the cursor, displaying the video outputs of all six (6) OSD ICs 350-357 on a single monitor, displaying the video output of a single OSD IC on a monitor, changing the video to any one of modes A-D as discussed above, debugging the option menu video display, displaying the built-in OSD IC patterns (i.e., 12×18 pixel matrix characters and symbols that are pre-programmed in the OSD IC's read only memory ("ROM")), debugging the pixel clock stability and position, enabling/disabling the option menu, changing the vertical size of individual option menu characters, indexing the display to a single color or a combination of red, green, and blue, etc.

System level IC 358 controls OSD ICs 350-357 via 12C bus 398 (i.e., a bi-directional, two wire, serial bus that provides a communication link between ICs). System level IC 358 also provides independent horizontal and vertical synchronization signals to OSD ICs 350-355 and OSD ICs 356-357 via connections 372 and 374, respectively. The provided synchronization signals are created based upon the adjustable gain control circuit horizontal and synchronization signals that are transmitted to system level IC 358 via connector 366 and connections 380 and 382, respectively. These signals synchronize the horizontal and vertical scans of the video signals to determine the start of each horizontal and vertical line.

System level IC 358 thus ensures that the OSD ICs 350-355 remain synchronized in creating the video to be displayed to the user as the option menu. System level IC 358 also combines the RGB output data received on line 370 to create the option menu output for the user. Specifically, if the system is in Mode A, then each OSD IC 350-355 contributes data for every pixel to be displayed thus increasing the color depth of the on-screen menu (e.g., to allow a list of connected computers to be color-coded). The system level IC 358 concatenates this data to be displayed to the user. Thus, Mode A allows for a greater number of colors or characters to be displayed than is standardly available with systems that utilize only one OSD IC.

If the system is in Mode B, each of the OSD ICs 350-355 contributes data for half of the pixels that comprise the on-screen. In Modes C and D, the outputs of each individual OSD IC provide a separate portion of the option menu thus allowing for display on a larger screen, or for a display with more characters. In these modes, the outputs are not combined to increase color depth, but instead to increase the size of the option menu. Again, system level IC 358 receives the data from each OSD IC 350-355 and creates the on-screen menu.

The cursor horizontal and vertical synchronization signals are supplied by system level IC 358 independent of the option menu horizontal and vertical synchronization signals to allow them to be shifted, which causes the cursor to appear as if it is moving in relation to the system user's movement of the cursor control device. In an alternative embodiment of the present invention, a different type of OSD IC may be incorporated that accepts a single composite horizontal and vertical synchronization signal in lieu of two, independent synchronization signals. After OSD ICs 350-357 generate the red, green, and blue video signals, system level IC 358 receives independent red, green, and blue video signals from each OSD IC 350-357 via connections 368 and 370. That is, system level IC 358 receives eighteen (18) different red, green, and blue video signals (i.e., one red, green, and blue signal from each of the six (6) OSD ICs 350-357). System level IC 358 processes these inputs and creates one combined red, green, and blue video signal, which is transmitted to D/A converter 364. The analog video signals are then transmitted to video switch 314 (FIG. 2A) via connection 388 and connector 366. Also, the combined (i.e., option menu and cursor) horizontal and vertical synchronization signals are transmitted to the main circuit board via connections 384 and 386, respectively, via connector 366. Thereafter, video switch 314 (FIG. 2A) transmits either the option menu video signals or the connected computer's video signals to video monitor 104 via video monitor port 312 (FIG. 2A).

Figure 2C:
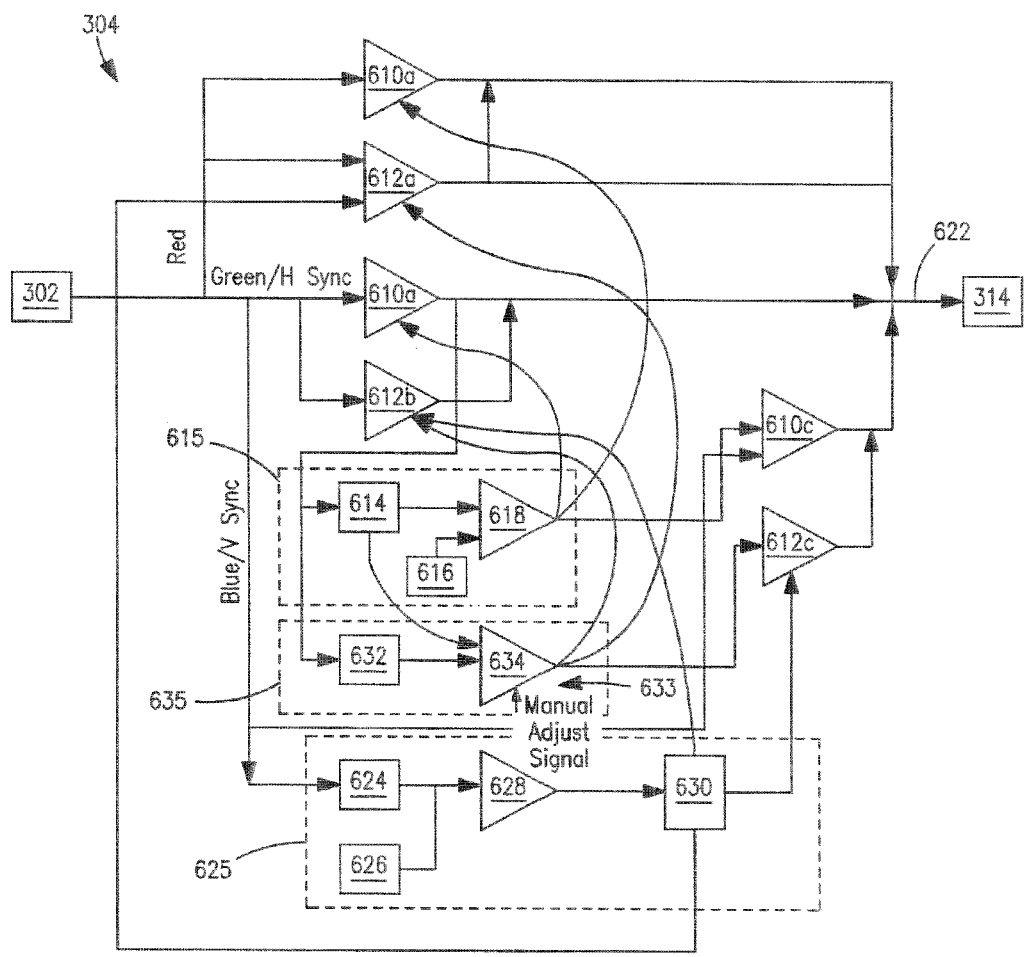
FIG. 2C is a schematic representation of the preferred embodiment of the tuning circuit shown in FIG. 2A, which compensates for the amplitude and frequency reduction that occurs during video signal transmission.

As discussed earlier, the connected computer's video is first tuned by tuning circuit 304. As shown in FIG. 2C, tuning circuit 304 preferably comprises red variable gain amplifier 610a, green variable gain amplifier 610b, blue variable gain amplifier 610c, red frequency compensation amplifier 612a, green frequency compensation amplifier 612b, blue frequency compensation amplifier 612c, slow peak detector 614, voltage source 616, comparator 618, slow peak detector 624, voltage source 626, comparator 628, video switch 630, fast peak detector 632, and comparator 634.

During system operation, the video signals generated at connected computer 118 are transmitted via communication link 120 to CIM 116 (FIG. 1). Thereafter, the video signals are transmitted from CIM 116 to MSU 112 via communication link 114 (FIG. 1). Even at this point in the transmission of the video signals, the amplitudes of the transmitted video signals may be significantly reduced and the frequencies of the video signals may be attenuated. Subsequently, the video signals are further transmitted from MSU 112 to UST 108 via communication link 110, wherein the video signals can experience further degradation. Therefore, tuning circuit 304 is implemented to automatically tune the received video signals to achieve the desired amplitude and frequency characteristics.

In the preferred embodiment, the horizontal synchronization signal is encoded on and transmitted with the green video signal, and the vertical synchronization signal is encoded on and transmitted with the blue video signal utilizing techniques known in the art. However, the horizontal and vertical synchronization signals may be encoded on and transmitted with any one of the red, green, or blue video signals. It is preferable that the horizontal and vertical synchronization signals are encoded as negative pulses, since the video signals (i.e., red, green, and blue) are typically positive pulses. This allows the system of the present invention to easily extract the sync signals.

The components of tuning circuit 304 combine to create three dedicated signal tuning circuits (i.e., one for each of the red, blue, and green video color signals), gain amplification adjustment circuit 615, frequency compensation amplification adjustment circuit 635, and additional filtering enablement circuit 625.

In operation, the red component of the video signal is initially transmitted to red variable gain amplifier 610a and red frequency compensation amplifier 612a. Preferably, red variable gain amplifier 610a adjusts the amplitude of the red component of the video signals based upon the output of gain amplification adjustment circuit 615. Concurrently, red frequency compensation amplifier 612a adjusts the frequency of the red component of the video signals based upon the output of frequency compensation amplification adjustment circuit 635. The outputs of red variable gain amplifier 610a and red frequency compensation amplifier 612a are electrically combined and transmitted via wire 622 to video switch 314 (FIG. 2A).

The green component of the video signal, including the encoded horizontal synchronization signal, is transmitted to green variable gain amplifier 610b and green frequency compensation amplifier 612b. The two outputs are then electrically combined and transmitted to gain amplification adjustment circuit 615 and frequency compensation amplification adjustment circuit 635. Gain amplification circuit 615 comprises slow peak detector 614, which receives the electrically combined outputs of green variable gain amplifier 610b and green frequency compensation amplifier 612b. Slow peak detector 614 detects the amplitude of the horizontal synchronization signal, which is encoded on the green component of the video signals, and transmits a signal representing this amplitude to comparator 618 and comparator 634. Comparator 618 then compares the signal received from slow peak detector 614 to a constant reference voltage supplied by voltage source 616. The signal supplied by voltage source 616 represents the desired amplitude for the horizontal synchronization signal. Next, comparator 618 transmits a signal to red variable gain amplifier 610a, green variable gain amplifier 610b, and blue variable gain amplifier 610c to adjust the level of amplification of the red, green, and blue components of the video signals until the desired amplitude is achieved.

Similarly, green frequency compensation amplifier 612b adjusts the level of amplification of the frequency of the horizontal synchronization signal based upon the output of frequency compensation amplification adjustment circuit 635. Frequency compensation amplification adjustment circuit 635 comprises fast peak detector 632 that also receives the electrically combined outputs of green variable gain amplifier 610b and green frequency compensation amplifier 612b. Fast peak detector 632 detects the rising edge of the horizontal synchronization signal and transmits a signal representing this rising edge to comparator 634. Then, comparator 634 compares the signal received from fast peak detector 632 to the output of slow peak detector 614 to compare the amplitude of the rising edge of the horizontal synchronization signal pulse to the amplitude of the horizontal synchronization signal pulse itself. Next, comparator 634 sends a signal that is fed to red frequency compensation amplifier 612a, green frequency compensation amplifier 612b, and blue frequency compensation amplifier 612c to adjust the level of amplification of the red, green, and blue components of the video signals until the desired frequency is achieved. Optionally, a system administrator may manually adjust (e.g., using the option menu discussed above or controls located on the exterior of the UST) the signal transmitted by comparator 634, whereupon this adjustment is input to tuning circuit 304 via manual input 633. Such a feature would allow the system user to manually "tweak" the gain of the video signals until a desired video output is achieved.

The blue component of the video signals, along with the encoded vertical synchronization signal, is initially transmitted to blue variable gain amplifier 610c, blue frequency compensation amplifier 612c, and filtering enablement circuit 625, which is employed to increase the range of red frequency compensation amplifier 612a, green frequency compensation amplifier 612b, and blue frequency compensation amplifier 612c when the video signals have been transmitted over approximately four hundred fifty (450) feet. The vertical synchronization signal, which is encoded on the blue component of the video signals as a precise square wave signal of known duration and amplitude, is used as a precise reference point for filtering enablement circuit 625. The blue component of the video signals and the encoded vertical synchronization signal are received by slow peak detector 624, which detects the amplitude of the vertical synchronization signal. Slow peak detector 624 transmits a signal representing the amplitude of the vertical synchronization signal to comparator 628, which compares it to the known amplitude of a similar signal transmitted for four hundred fifty (450) feet. This known amplitude is represented by a constant reference voltage applied to comparator 628 by voltage source 626. If comparator 628 determines that the vertical synchronization signal (and therefore all of the video signals) has been transmitted over four hundred fifty (450) feet, a signal indicating this is transmitted to video switch 630. Video switch 630 then sends a signal to red frequency compensation amplifier 612a, green frequency compensation amplifier 612b, and blue frequency compensation amplifier 612c to increase the range of each frequency compensation amplifier 612a, 612b, and 612c.

Subsequent to the amplification by gain amplification adjustment circuit 615 and the frequency compensation by frequency compensation amplification adjustment circuit 635, the tuned red, green, and blue components of the video signals are transmitted to video switch 314 (FIG. 2A). Thereafter, video switch 314 determines whether to transmit the video signals received from tuning circuit 304 (i.e., the video signals received from one of the connected computers 118) or the video signals received from option menu circuit 318 to video amplifier 316. Finally, the amplified video signals are transmitted via video monitor port 312 for display on video monitor 104.

Figure 4:
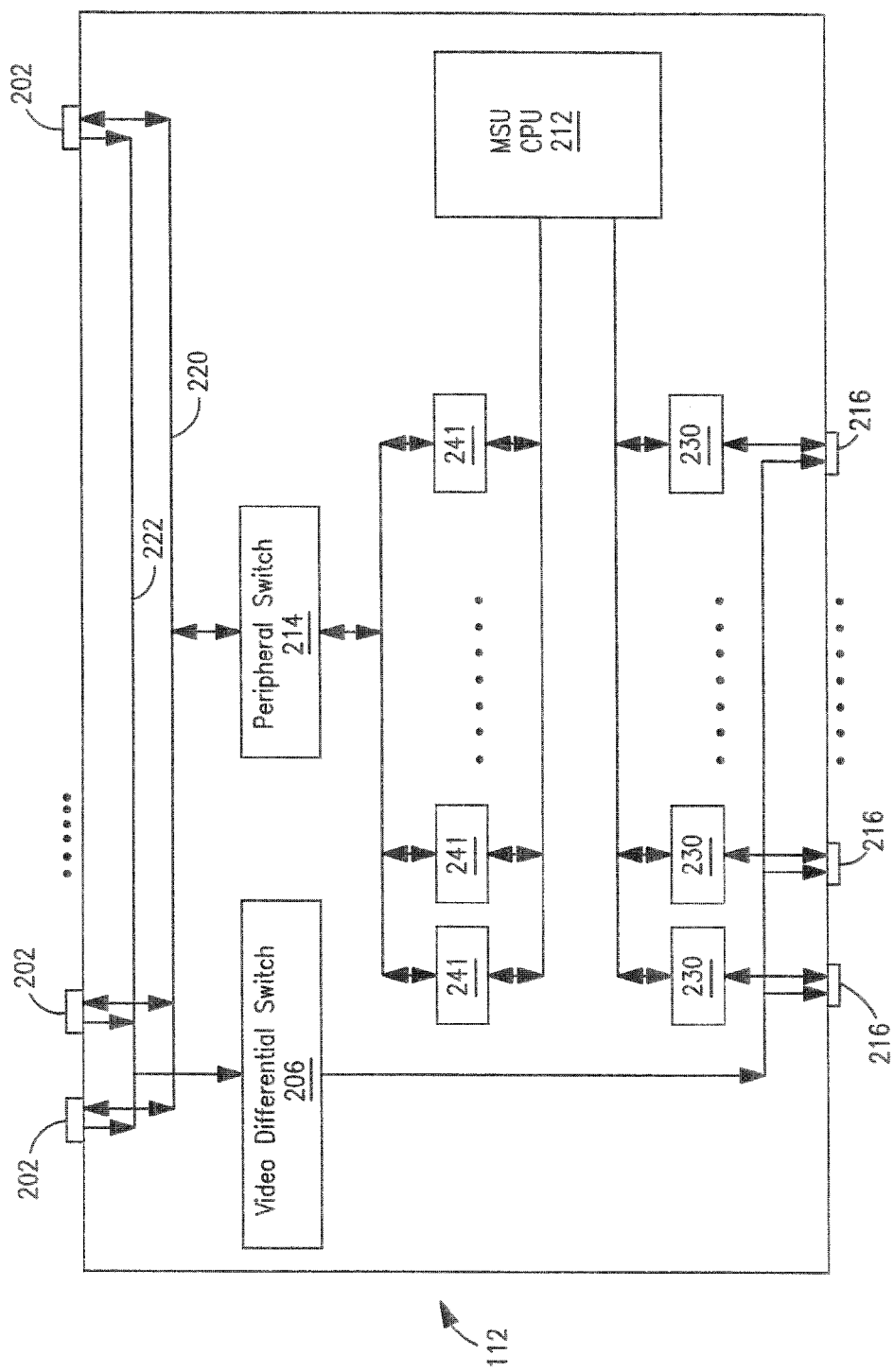
FIG. 4 is a schematic representation of the MSU shown in FIG. 1 according to the preferred embodiment of the present invention illustrating a block diagram of the internal structure of the MSU and electrical connectors for CAT 5 cables.

Turning next to FIG. 4, depicted is a schematic representation of the preferred embodiment of MSU 112, according to the invention, which enables multiple users to access and operate a plurality of connected computers. Access by a user to one of the connected computers from a local user workstation is performed completely via one or more MSUs 112, independent of any network that may couple the connected computers to each other such as a Local Area Network, Wide Area Network, etc. In other words, the computer management system of the present invention preferably does not utilize an existing computer network to allow a local user workstation to control the connected computers. Rather, it is preferred that all physical connections between the local user workstation and the connected computers occur through one or more MSUs 112.

In the preferred embodiment, MSU 112 comprises a plurality of CIM ports 202 that are preferably RJ-45 sockets, which allow each CIM 116 to be connected to MSU 112 via an independent communication link 114 (FIG. 1). The unidirectionally transmitted (i.e., from the connected computer to the user workstation only) video signals are received at the MSU 112 through CIM ports 202 onto video bus 222, whereupon they are transmitted to video differential switch 206. Video differential switch 206 is capable of transmitting any video signals received from video bus 222 to any UST port 216. The transmitted video signals are then transmitted via independent communication link 110 to attached UST 108 (FIG. 1).

In addition to transmitting the unidirectional video signals, MSU 112 bi-directionally transmits keyboard and cursor control device signals between USTs 108 and CIMs 116 (FIG. 1). When transmitting the signals from one CIM 116 to one UST 108, these signals are received through CIM ports 202 on peripheral bus 220, whereupon they are transmitted to peripheral switch 214. Thereafter, peripheral switch 214 transmits these signals to the appropriate CIM universal asynchronous receiver transmitter ("UART") 241, which de-serializes the signals (i.e., converts the signals from a serial format to a format that is compatible with the MSU 112, e.g., parallel format) and transmits them to MSU central processing unit ("CPU") 212. MSU CPU 212 analyzes the received signals and generates a new data packet based upon command information contained within the received signals. The new data packet is transmitted to the appropriate UST UART 230. UST UART 230 then serializes the signals and transmits them to the appropriate UST port 216 for transmission via independent communication link 110 to the appropriate UST 108 (FIG. 1).

Conversely, MSU 112 also transmits keyboard and cursor control device signals received at one UST 108 to one CIM 116 connected to a connected computer 118 (FIG. 1). The keyboard and cursor control device signals are received at UST 108 and transmitted via communication link 110 to the respective UST port 216 located at MSU 112. Thereafter, these signals are transmitted to UST UART 230, which de-serializes the signals and transmits them to MSU CPU 212. MSU CPU 212 interprets the information contained in the data packets of the received signals to create new signals, which also represent newly generated data packets. These new signals are then transmitted to the CIM UART 241 that is associated with the desired connected computer 118. CIM UART 241 serializes the signals and transmits them to peripheral switch 214, which transmits the signals to the desired CIM port 202 via peripheral bus 220. Subsequently, the keyboard and cursor control device signals are transmitted via communication link 114 to the appropriate CIM 116, which is connected to the desired connected computer 118 (FIG. 1).

Figure 5:
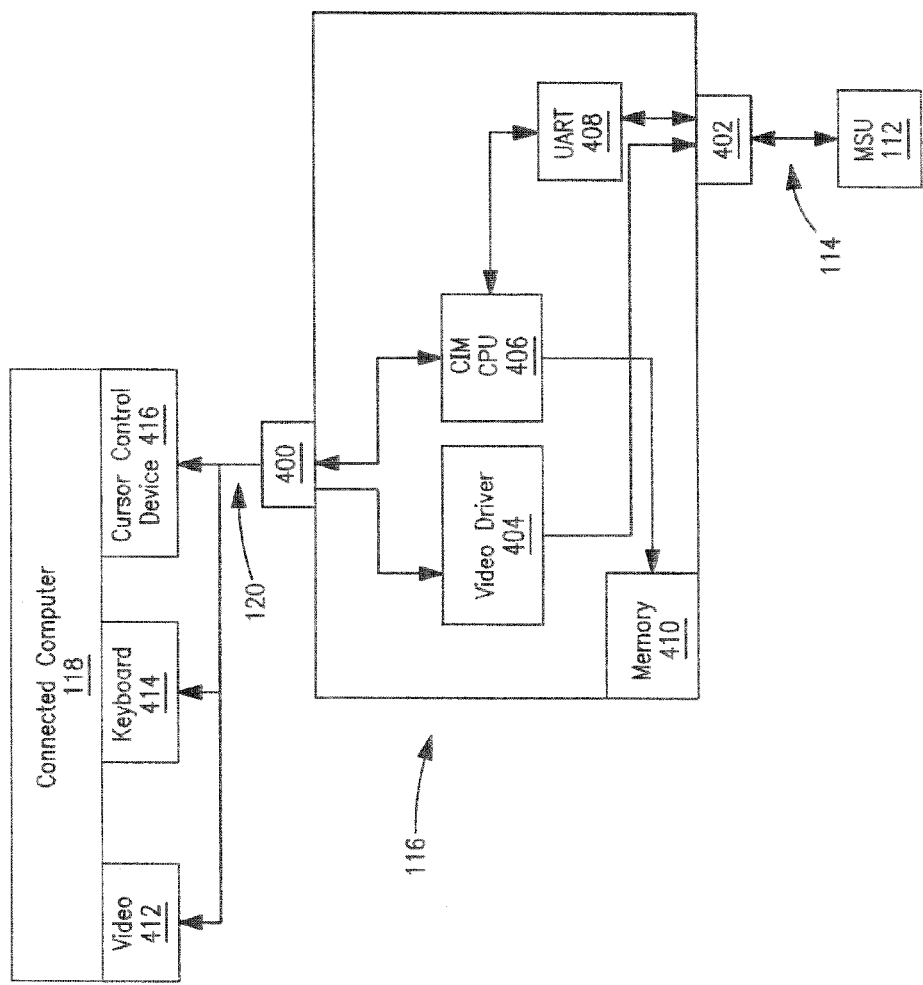
FIG. 5 is a schematic representation of the preferred embodiment of the internal structure of the CIM shown in FIG. 1, illustrating the connection of the CIM to a connected computer and to an MSU.

Turning next to FIG. 5, shown is a schematic diagram of CIM 116. Preferably, each CIM 116 is compatible with all present day computer systems including, but not limited to, those manufactured by Microsoft (Windows), Apple (Macintosh), Sun (Unix), DEC, Compaq (Alpha), IBM (RS/6000), HP (HP9000) and SGI (IRIX). However, it is foreseeable that the technology of the present invention will also be compatible with those computer systems not yet contemplated.

CIM 116 connects video port 412, keyboard port 414 and cursor control device port 416 of connected computer 118 with MSU 112 via CAT 5 communication link 120 and port 400. Video signals are transmitted through CIM 116 unidirectionally from connected computer 118 to MSU 112. However, as discussed previously, keyboard and cursor control device signals may be transmitted bi-directionally between connected computer 118 and MSU 112.

During operation, video signals are transmitted from video port 412 of connected computer 118 to port 400 of CIM 116 via communication link 120. From port 400, the unidirectional video signals are transmitted to video driver 404, which converts the standard red, green and blue video signals to a differential signal for transmission through port 402 to MSU 112 via communication link 114. Each color signal is transmitted via its own twisted pair of wires contained within communication link 114 (when transmitted from CIM 116 to MSU 112) or communication link 110 (when transmitted from MSU 112 to UST 108)(FIG. 1). Furthermore, video driver 404 appends the horizontal and vertical synchronization signals to one of the red, green or blue video signals to allow all five components of the video signals to be transmitted via only three twisted pair of wires of communication links 110 and 114. That is, preferably, the horizontal and vertical synchronization signals are each transmitted on its own color signal—not the same color signal.

In contrast, keyboard and cursor control device signals generated at connected computer 118 are received by CIM CPU 406 from keyboard port 414 and cursor control device port 416, respectively, via communication link 120 and port 400. CIM CPU 406 generates data packets representing the keyboard and cursor control device information in the received signals. The newly generated data packets are transmitted to UART 408, which serializes the signals and transmits them via communication link 114 to MSU 112 through port 402.

Conversely, keyboard and cursor control device signals received from the local user workstation through MSU 112 and communication link 114 (FIG. 1) are received at port 402. Thereafter, UART 408 de-serializes the received data packet signals and transmits them to CIM CPU 406. Alternatively, the received data packet signals may be de-serializes by a non-UART device. CIM CPU 406 uses the information contained in the data packet signals to emulate keyboard and cursor control device signals. These emulated signals are applied to keyboard port 414 and cursor control device port 416 through port 400 via communication link 120.

Furthermore, CIM 116 contains memory unit 410, which stores the address and status of connected computer 118. Thus, if a specific connected computer 118 is not functioning properly, it is easy to assess which connected computer 118 has malfunctioned. In addition, the device address facilitates proper transmitting of the keyboard and cursor control device signals since the device address is included in the data packets generated by CIM CPU 406 and is therefore transmitted with these signals. Additionally, memory unit 410 allows a connected computer 118 to be easily identified even if it is relocated and connected to a new CIM 116. Therefore, the information contained in memory unit 410 maintains the modular nature of the computer management system of the present invention.

Preferably, connected computer 118 provides power to CIM 116, thereby eliminating the equipment, cabling and space required for a dedicated CIM power source.

Figure 6:
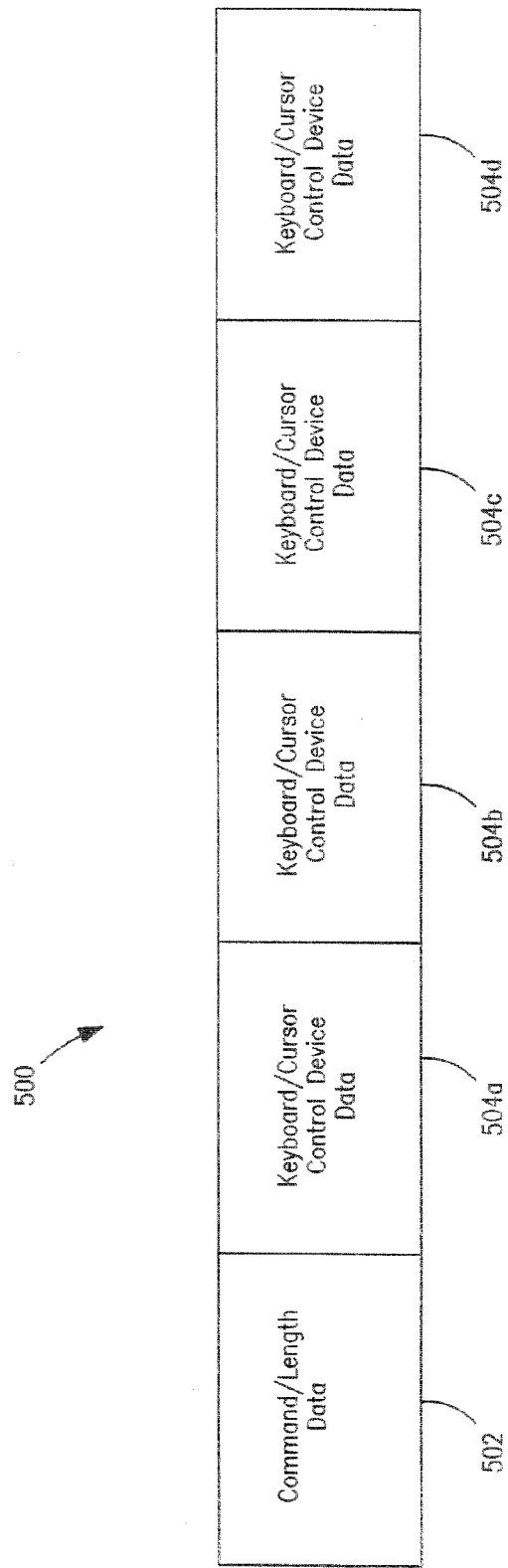
FIG. 6 is a schematic representation of a data packet used to transmit data in the computer management system according to the preferred embodiment of the present invention.

Referring next to FIG. 6, provided is an example of a data packet used to transmit keyboard and cursor control device information. In the example, protocol data packet 500 consists of five bytes. First byte 502 comprises the instructional, or command, data and data indicating the total length of data packet 500. That is, the first half of first byte 502 contains the command data and the second half of first byte 502 contains length data. The subsequent four bytes 504a-d include the characters typed on keyboard 102 and clicks performed with cursor control device 106 (FIG. 1).

It is well known in the art to transmit command and length data in separate bytes. Therefore, utilizing conventional data packet technology, the data packet of the present invention would need to contain six bytes (i.e., one byte for command data, one byte for length data and four bytes for system data). In contrast, the preferred embodiment of the present invention minimizes the size of the data packet by combining the command and length data into one byte, thereby allowing four bytes of system data to be transmitted in a five-byte data packet. Consequently, signal transmission in the intelligent, modular server management system of the present invention is more efficient, allowing a single CAT 5 cable to be used for transmission of keyboard, cursor control device and video signals.

Figure 7:
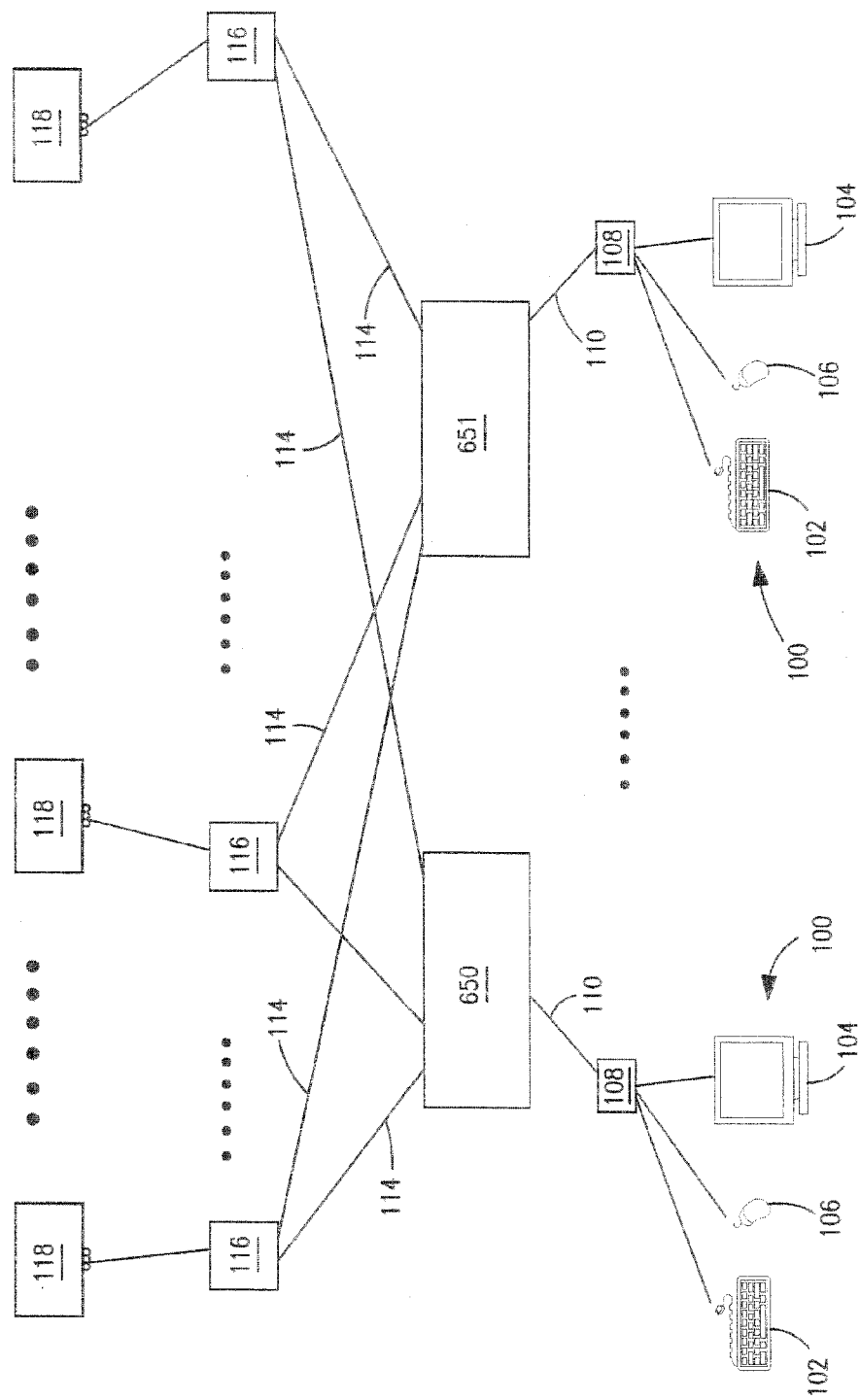
FIG. 7 is a schematic representation of an alternate configuration of the computer management system for use with the present invention illustrating connection of sixteen (16) user workstations and multiple connected computers to two MSUs, wherein the alternate embodiment may accommodate as many as thirty-two (32) connected computers.

Referring next to FIG. 7, disclosed is an alternate embodiment of the intelligent, modular computer management system of the present invention in which the system is expanded to include two (2) MSUs 112, each having eight (8) inputs and thirty-two (32) outputs. This configuration allows sixteen (16) USTs 108 to access and operate thirty-two (32) connected computers 118. In this alternate embodiment, each UST 108 may be linked to either first MSU 650 or second MSU 651 via communication link 110. All signals received at UST 108 are transmitted via its connected MSU (i.e., either first MSU 650 or second MSU 651) to CIM 116 that is connected to the desired connected computer 118. In this alternate embodiment, CIM 116 provides connectors for two (2) communication links 114 to allow it to connect to both first MSU 650 and second MSU 651. Thus, CIM 116 allows sixteen (16) user workstations 100 to operate thirty-two (32) connected computers 118. Importantly, the option menu of the present invention may be easily incorporated into each UST in this alternate embodiment. Therefore, even in this expanded configuration, each system user may choose one of the four modes A-D of operation for the option menu displayed on the user workstation's monitor. In addition, this embodiment allows two (2) user workstations 100 to simultaneously access and operate the same connected computer 118. Alternatively, this embodiment allows a first user workstation 100 to inform a second user workstation 100 that a connected computer 118 is in use and, therefore, access to it is restricted.

Figure 8:
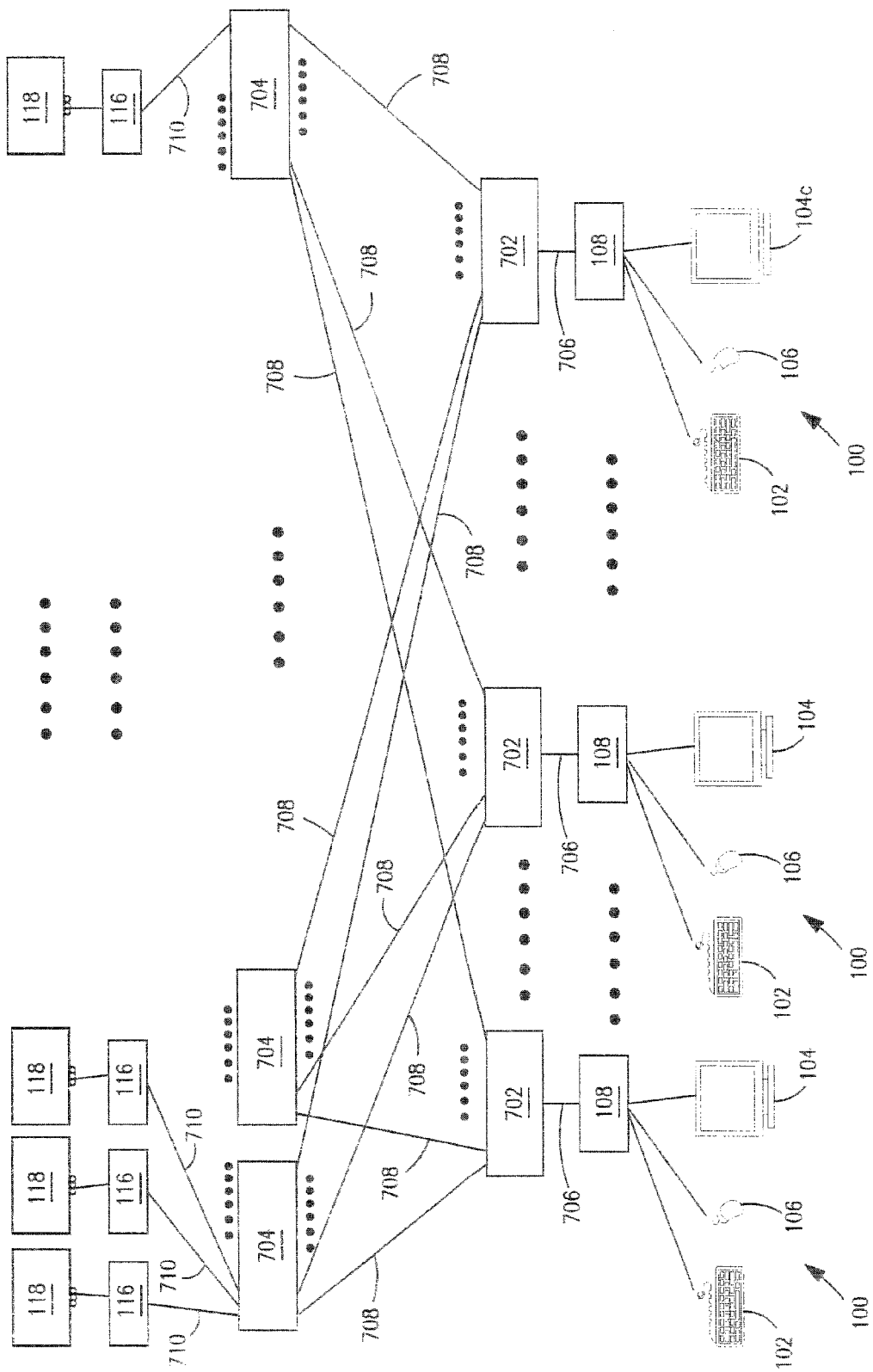
FIG. 8 is a schematic representation of another alternate configuration of the computer management system for use with the present invention illustrating connection of multiple user workstations and multiple connected computers to multiple MSUs, wherein the alternate embodiment may accommodate as many as sixty-four (64) user workstations and ten thousand (10,000) connected computers.

Referring next to FIG. 8, disclosed is another alternate embodiment of the intelligent, modular server system of the present invention. The use of forty (40) total MSUs (i.e., eight (8) first tier MSUs 702 and thirty-two (32) second tier MSUs 704), wherein each first tier MSU 702 and second tier MSU 704 has eight (8) inputs and thirty-two (32) outputs, allows sixty-four (64) user workstations 100 to operate and access one thousand twenty four (1,024) connected computers 118. In this alternate embodiment, each UST 108 is directly linked to one of eight (8) first tier MSUs 702 via single CAT 5 cable 706. First tier MSU 702 transmits all signals received from user workstation 100 via single CAT 5 cable 708 to second tier MSU 704 that is connected to the CIM 116 associated with the desired connected computer 118. Second tier MSU 704 then transmits the received signals to the respective CIM 116 via single CAT 5 cable 710, whereupon CIM 116 applies these signals to the respective ports of connected computer 118. In this embodiment, the second tier of MSUs 704 comprises thirty-two (32) units. Each second tier MSU 704 is coupled to multiple CIMs 116, which provide a direct connection to each of the one thousand twenty four (1,024) potential connected computers 118 via single CAT 5 cables 710. Importantly, the option menu of the present invention may also be easily incorporated into each UST in this alternate embodiment. Therefore, even in this expanded configuration, each system user may choose one of the four modes of operation for the option menu displayed on the user workstation's monitor.

Although FIG. 8 depicts the configuration used to access and control one thousand twenty four (1,024) connected computers 118 from sixty-four (64) user workstations 100, many other system configurations are available to allow a greater number of user workstations 100 to be connected to a greater number of connected computers 118. For example, the number of MSU tiers may be increased, or, alternatively, hubs may be incorporated. Also, each MSU may be designed to comprise more than eight (8) inputs and more than thirty-two (32) outputs to further increase the system capacity. Furthermore, the option menu may be used with any configuration of the computer management system of the present invention.

Because the option menu allows for more colors, and characters, more information about the available connected computers can be displayed to a user. Further, because the option menu can be displayed on a larger screen, the user can view more of the available network at one time. Therefore, the present invention allows for a more efficient and user friendly way of managing a large computer network.

Figure 9:
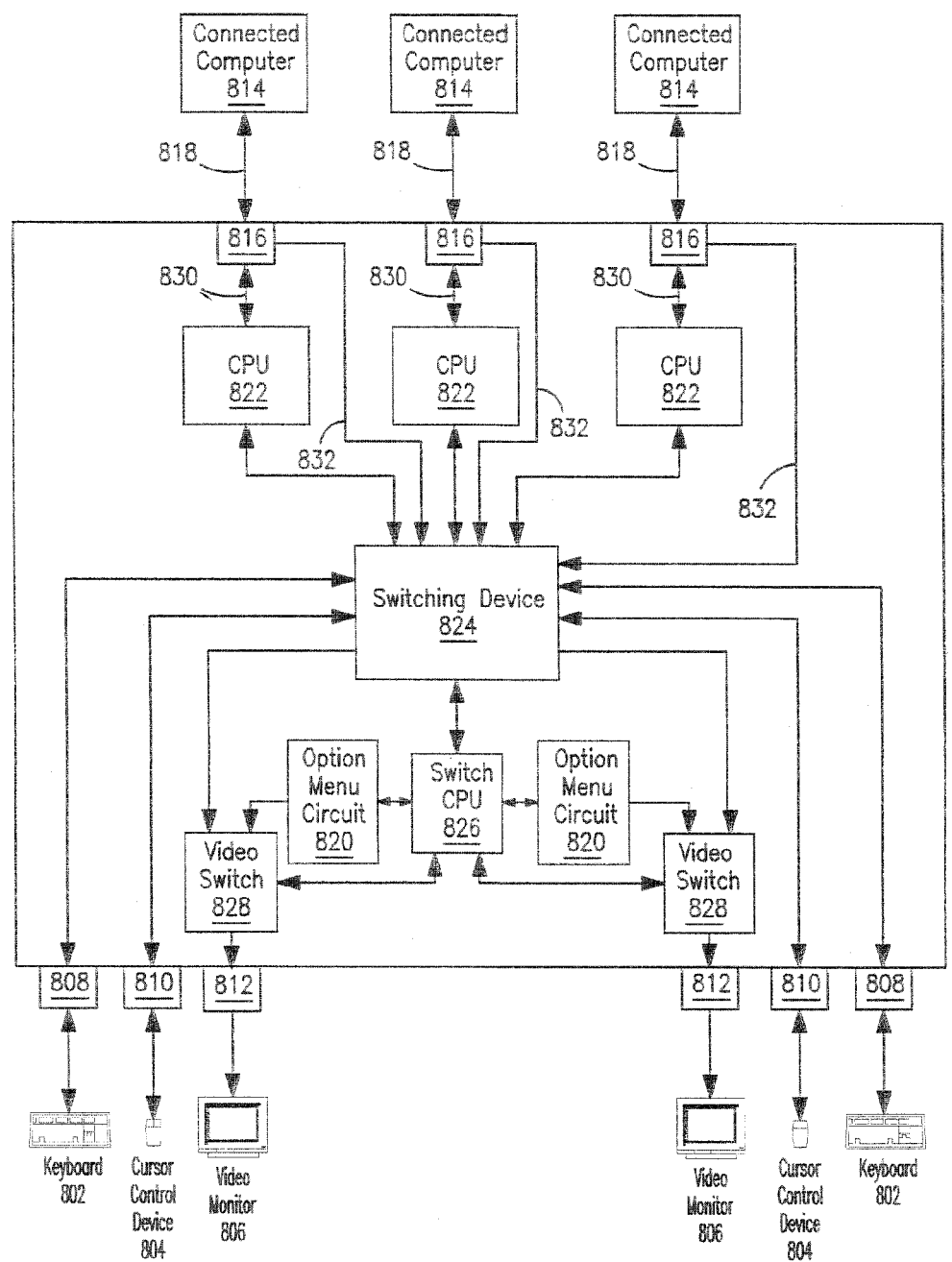
FIG. 9 is a schematic representation of an alternate embodiment of the computer management system of the present invention, wherein the computer management system is contained in a single unit that is directly connected to all connected computers and user workstations.

Turning next to FIG. 9, depicted is an alternate embodiment of the computer management system of the present invention. Specifically, single unit computer management system 800 is shown connected to keyboards 802, cursor control devices 804, and video monitors 806 via keyboard ports 808, cursor control device ports 810, and video monitor ports 812, respectively, utilizing industry standard cabling or wireless connections. Also, the keyboard, cursor control device, and video monitor ports of connected computers 814 are connected to computer ports 816 on single unit computer management system 800 via communication links 818.

Each CPU 822 receives keyboard and cursor control device signals from its respective computer port 816 via the respective communication link 830 and converts them to a digital format. After these signals have been digitized, they are transmitted to switching device 824. In contrast, video signals transmitted to computer port 816 by connected computer 814 bypass CPU 822 and are transmitted directly to central switching device 824 via communication link 832.

Switching device 824, based upon instructions received from switch CPU 826, transmits the keyboard and cursor control device signals to the intended keyboard 802 and cursor control device 804 via keyboard port 808 and cursor control device port 810, respectively. In contrast, switching device 824 transmits the video signals to video switch 828. Then, based upon the instructions provided by switch CPU 826, video switch 828 supplies either the video signals received from connected computer 814 or the video signals generated by option menu circuit 820 to video monitor 806 via video monitor port 812. When the option menu is displayed, video switch 828 replaces a portion of the video display that is received from connected computer 814 through switching device 824 with the option menu video display generated by option menu circuit 820.

Keyboard and cursor control device signals are also routed from keyboard 802 and cursor control device 804 through keyboard port 808 and cursor control device port 810, respectively, to computer CPU 822 via switching device 824. CPU 822 then emulates keyboard and mouse signals to the selected connected computer 814 via port 816. In contrast, video signals are transmitted only from connected computer 814 to video monitor 806 only.

Single unit computer management system 800 incorporates option menu circuit 820, which comprises the same electrical components and configuration as option menu circuit 318 (FIGS. 2A and 2C). Option menu circuit 820 enables a user to select any one of the connected computers 814 from an option menu displayed on video monitor 806. For example, if a user wishes to connect to a specific connected computer 814, the user may first enter preselected keyboard and/or cursor control device commands utilizing keyboard 802 and/or cursor control device 804 to display an option menu on video monitor 806. The option menu includes all connected computers 814 connected to the computer management system. By utilizing keyboard 802 and cursor control device 804, the user selects the desired connected computer 814 from the option menu. Thereafter, the option menu is no longer displayed and the video signals generated by connected computer 814 are displayed on video monitor 806. The user may then control connected computer 814 using keyboard 802 and cursor control device 804 as if they are directly connected to connected computer 814.

In addition to selecting one of the connected computers 814, the option menu is also used to perform administrative functions such as system programming, tuning the received video signals, obtaining single unit computer management system diagnostics, etc. Furthermore, multiple security features such as passwords, system user histories, etc. may be implemented and accessed via the option menu. The use of the option menu of the present invention allows single unit computer management system 800 to display a larger option menu and/or an option menu having more characters or more colors to achieve the benefits discussed above with respect to the preferred embodiment of the present invention.

While the present invention has been described with reference to the preferred embodiments and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A user terminal device for producing an option menu, said user terminal device comprising:
    a first set of on-screen display circuits capable of producing a first video output for display on a video display;
    a second set of on-screen display circuits capable of producing a second video output for display on the video display; and
    a processor coupled to said first and second sets of on-screen display circuits, for configuring the video outputs of ones of the first set of on-screen display circuits and ones of the second set of on-screen display circuits to generate an option menu on the video display,
    wherein a first number of first video outputs of the first set of on-screen display circuits are selectably combined by the processor according to a mode index of the display to form a non-cursor portion of the option menu, the combination of first video outputs producing an increase in available colors to be displayed as compared to a first video output from a single one of the first set of on-screen display circuits, and
    wherein the second set of on-screen display circuits are cursor image producing circuits for producing a cursor image within said option menu.

2. A device according to claim 1, wherein the first set of on-screen display circuits are capable of producing multiple background colors, multiple foreground colors, and a video display having a plurality of rows and columns of characters, and wherein each character comprises a plurality of pixels.

3. A device according to claim 1, wherein the first set of on-screen display circuits are capable of displaying characters in a plurality of fonts.

4. A device according to claim 1, wherein the first set of on-screen display circuits are capable of displaying a plurality of colors.

5. A device according to claim 1, wherein said first number of combined video outputs of the on-screen display circuits from the first set of on screen display circuits for display on said video display is at least two.

6. A device according to claim 1, wherein said device is disposed in a keyboard, video and cursor control device (KVM) switching system.

7. A device according to claim 6, wherein dimensions of said option menu are variable.

8. A device according to claim 6, wherein said option menu is displayed on the entire video display when the mode index has a first predetermined value.

9. A device according to claim 6, wherein color depth of said option menu can be changed using a keyboard or a cursor control device.

10. A device according to claim 1, wherein said cursor image is controlled via an attached keyboard and/or cursor control device.

11. A device according to claim 1, wherein said second set of on-screen display circuits are comprised of at least one outline generating on-screen display circuit for producing an outline of said cursor image and at least one on-screen display circuit for generating a body of said cursor image.

12. A device according to claim 1, further comprising:
a first clock for controlling a first timing of said first set of on-screen display circuits; and
a second clock for controlling a second timing of said second set of on-screen display circuits.

13. A device according to claim 1, wherein said device is implemented on a daughter board to facilitate connection to a KVM switch system.

14. A device according to claim 1, wherein said processor produces an option menu in digital video format.

15. A device according to claim 1, wherein said processor produces said option menu in analog video format.

16. A device according to claim 1, wherein said option menu is displayed on a 4:3 ratio video monitor.

17. A device according to claim 1, wherein said option menu is displayed on a 16:9 ratio video monitor.

18. A device according to claim 1, wherein said option menu is displayed in conjunction with an external video source.

19. A device according to claim 1, wherein said first number of video outputs from the first set of on-screen display circuits are combined and a second number of video outputs from the first set of screen display circuits are combined, such that each combination of said numbers of video outputs is displayed on a different section of said video display.

20. A device according to claim 1, wherein the first set of on-screen display circuits contains at least four on-screen display circuits and the second set of on-screen display circuits contains at least two on-screen display circuits.

21. A device according to claim 1, wherein the combination of first video outputs produce an increase in a number of characters to be displayed in the non-cursor portion of the option menu as compared to a first video output from a single one of the first set of on screen display circuits.

* * * * *